US011126800B2

(12) United States Patent
Ma et al.

(10) Patent No.: US 11,126,800 B2
(45) Date of Patent: Sep. 21, 2021

(54) SYSTEMS AND METHODS FOR SIMULTANEOUS TRANSLATION WITH INTEGRATED ANTICIPATION AND CONTROLLABLE LATENCY (STACL)

(71) Applicant: Baidu USA, LLC, Sunnyvale, CA (US)

(72) Inventors: Mingbo Ma, Milpitas, CA (US); Liang Huang, Mountain View, CA (US); Hao Xiong, Beijing (CN); Kaibo Liu, Sunnyvale, CA (US); Chuanqiang Zhang, Beijing (CN); Renjie Zheng, Corvallis, OR (US); Zhongjun He, Beijing (CN); Hairong Liu, San Jose, CA (US); Xing Li, Santa Clara, CA (US); Hua Wu, Beijing (CN); Haifeng Wang, Beijing (CN); Baigong Zheng, Sunnyvale, CA (US)

(73) Assignee: Baidu USA LLC., Sunnyvale, CA (US)

( * ) Notice: Subject to any disclaimer, the term of this patent is extended or adjusted under 35 U.S.C. 154(b) by 182 days.

(21) Appl. No.: 16/409,503

(22) Filed: May 10, 2019

(65) Prior Publication Data

US 2020/0104371 A1 Apr. 2, 2020

Related U.S. Application Data

(60) Provisional application No. 62/738,367, filed on Sep. 28, 2018.

(51) Int. Cl.
*G06F 40/58* (2020.01)
*G06N 3/08* (2006.01)
(Continued)

(52) U.S. Cl.
CPC ............ *G06F 40/58* (2020.01); *G06F 40/274* (2020.01); *G06F 40/284* (2020.01); *G06F 40/42* (2020.01); *G06F 40/47* (2020.01); *G06N 3/08* (2013.01)

(58) Field of Classification Search
CPC ........... G06F 40/58; G06F 40/42; G06F 40/47
See application file for complete search history.

(56) References Cited

U.S. PATENT DOCUMENTS 10,572,603 B2 * 2/2020 Yu ........................ G06N 3/0472
10,747,962 B1 * 8/2020 Fuerstenau ............. G06F 40/55
(Continued)

OTHER PUBLICATIONS

Dalvi et al. "Incremental decoding and training methods for simultaneous translation in neural machine translation." arXiv preprint arXiv:1806.03661. (Year: 2018).*
(Continued)

*Primary Examiner* — Samuel G Neway
(74) *Attorney, Agent, or Firm* — North Weber & Baugh LLP

(57) ABSTRACT

Presented herein are embodiments of a prefix-to-prefix framework for simultaneous translation that implicitly learns to anticipates in a single translation. Within these frameworks are effective "wait-k" policy model embodiments that may be trained to generate a target sentence concurrently with a source sentence but lag behind by a predefined number of words. Embodiments of the prefix-to-prefix framework achieve low latency and better quality when compared to full-sentence translation in four directions: Chinese↔English and German↔English. Also presented herein is a novel latency metric that addresses deficiencies of previous latency metrics.

20 Claims, 24 Drawing Sheets

(51) Int. Cl.

| | |
|---|---|
| ***G06F 40/274*** | (2020.01) |
| ***G06F 40/284*** | (2020.01) |
| ***G06F 40/42*** | (2020.01) |
| ***G06F 40/47*** | (2020.01) |

(56) References Cited

U.S. PATENT DOCUMENTS

| | | | | |
|---|---|---|---|---|
| 2019/0171715 | A1* | 6/2019 | Hodge | H04M 3/42 |
| 2019/0266246 | A1* | 8/2019 | Wang | G06F 40/58 |
| 2020/0104371 | A1* | 4/2020 | Ma | G06F 40/58 |

OTHER PUBLICATIONS

Yang et al.,"Breaking the beam search curse: A study of (Re-) scoring methods and stopping criteria for neural machine translation," 2018. (6pgs).

He et al.,"Improved Neural Machine Translation with SMT Features," In Proc. of the 30th AAAI Conf. on Artificial Intelligence, AAAI Press, 2016. (7pgs).

Moser-Mercer et al."Prolonged turns in interpreting:Effects on quality, physiological and psychological stress (pilot study)," Interpreting 3:1, 1998. (18pgs).

P. Palazchenko,"My Years with Gorbachev and Shevardnadze: The Memoir of a Soviet Interpreter," Penn State University Press, 1997. (1pg).

Bangalore et al.,"Real-time Incremental Speech-to-Speech Translation of Dialogs," In Proc. of NAACLHLT, 2012. (9pgs).

Jaitly et al.,"An Online Sequence-to-Sequence Model Using Partial Conditioning," In NIPS, 2016. (9pgs).

He et al.,"Syntax-based rewriting for simultaneous machine translation," In Empirical Methods in Natural Language Processing, 2015. (10 pgs).

Huang et al.,"When to finish? optimal beam search for neural text generation (modulo beam size)," In EMNLP, 2017. (6pgs).

Klein et al.,"OpenNMT: Open-Source Toolkit for Neural Machine Translation," arXiv preprint arXiv:1701.02810, 2017. (6 pgs).

Matsubarayx et al.,"Simultaneous Japanese-English interpretation based on early prediction of english verb," The 4th Symposium on Natural Language Processing, 2000. (6pgs).

Oda et al.,"Optimizing segmentation strategies for simultaneous speech translation," In Proc.of the 52 Annual Meeting of the Association for Computational Linguistics,2014.(6pg.

Oda et al.,"Syntax-based Simultaneous Translationthrough Prediction of Unseen Syntactic Constituents," In Proc. of the 53rd Annual Meeting of the Association for Computational Linguistics & the 7th Intr. Joint Conf. on Natural Language Processing, 2015. (10pgs).

Press et al.,"You may not need attention," arXiv preprint arXiv: 1810.13409, 2018. (7pgs).

Sennrich et al.,"Neural machine translation of rare words with subword units," arXiv preprint arXiv:1508.07909, 2016. (11pgs).

Vaswani et al.,"Attention Is All You Need," arXiv preprint arXiv:1706.03762, 2017. (15pgs).

Alinejad et al.,"Prediction Improves Simultaneous Neural Machine Translation," In Proc. of the 2018 Con. on Empirical Methods in Natural Language Processing, 2018. (6pgs).

Bahdanau et al.,"Neural machine translation by jointly learning to align and translate," arXiv preprint, 2016. (15pgs).

Cho et al.,"Can neural machine translation do simultaneous translation?," arXiv preprint arXiv:1606.02012, 2016. (9pgs).

Fujita et al.,"Simple, lexicalized choice of translation timing for simultaneous speech translation," In: Proc. of the Annual Con. of the Intr. Speech Communication Association, INTERSPEECH, 2013. (5pgs).

Grissom et al.,"Don't until the final verb wait: Reinforcement learning for simultaneous machine translation," In: Proc. of the 2014 Conf. on empirical methods in natural language processing (EMNLP), 2014. (11pgs).

Grissom et al.,"Incremental prediction of sentence-final verbs: Humans versus machines," In Proc. of the 20th SIGNLL Conf.on Computational Natural Language Learning, 2016.(10p.

Gu et al.,"Learning to translate in Real-time with neural machine translation," arXiv preprint arXiv:1610.00388, 2017. (10pgs).

He et al.,"Interpretese vs. translationese: The uniqueness of human strategies in simultaneous interpretation," In NAACL-HLT, 2016. (6pgs).

* cited by examiner

| | Bùshí | zǒngtǒng | zài | Mòsīkē | | yǔ | Pǔjīng | huīwǔ | |
|---|---|---|---|---|---|---|---|---|---|
| | 布什 | 总统 | 在 | 莫斯科 | | 与 | 普京 | 挥舞 | |
| | Bush | President | in | Moscow | | with | Putin | meet | |
| simultaneous: wait-2 | ...wait 2 words... | | | | Pres. Bush | met | | with | Putin in Moscow |
| non-simultaneous baseline | | | | | ...wait whole sentence... | | | | pres. bush met with putin in Moscow |

| | 布什 | 总统 | 在 | 莫斯科 | 与 | 普京 | 挥舞 | |
|---|---|---|---|---|---|---|---|---|
| simultaneous: non-predictive | ...wait 2 words... | | | ...wait 5 words... | | | met | with Putin in Moscow |

800

```
┌─────────────────────────────────────────────┐
│ TRAINING A PREFIX-TO-PREFIX MODEL ADJUST THE│
│ DIFFERENCE BETWEEN THE NUMBER OF TARGET AND │
│ SOURCE LANGUAGE TOKENS TO KEEP THEIR RATIO  │─⟋ 805
│ ABOUT THE SAME BY ADDING OR SUBTRACTING, ON │
│ AVERAGE, A CONSTANT NUMBER OF SOURCE        │
│ LANGUAGE TOKENS TO PREVENT A TRANSLATION DELAY│
│ FROM INCREASING OVER TIME                   │
└─────────────────────────────────────────────┘
                      │
                      ▼
┌─────────────────────────────────────────────┐
│ INVERTING THE RATIO WHEN INTERPRETING IN A  │─⟋ 810
│ REVERSE DIRECTION                           │
└─────────────────────────────────────────────┘
```

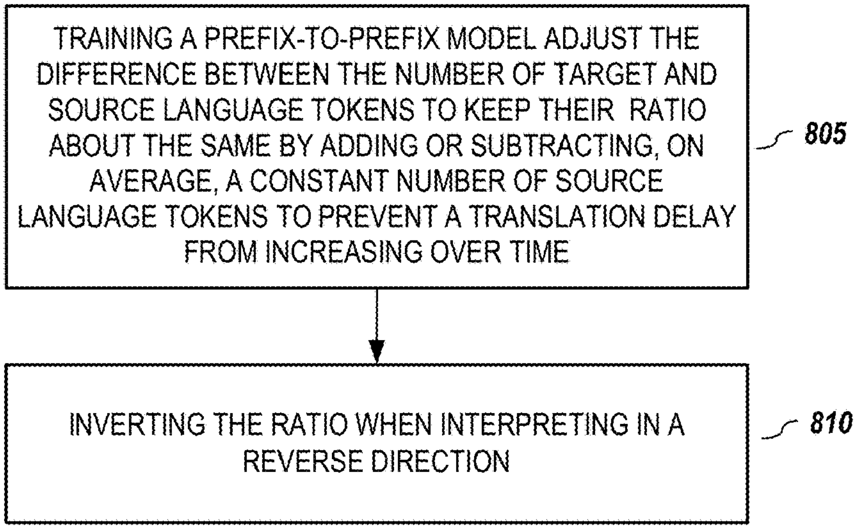

FIG. 8

|       | 1           | 2             | 3         | 4           | 5                 | 6           | 7         | 8               | 9              | 10            | 11              |              |                |
|-------|-------------|---------------|-----------|-------------|-------------------|-------------|-----------|-----------------|----------------|---------------|-----------------|--------------|----------------|
|       | jiāng 江 Jiang | zémín 泽民 Zeming | duì 对 to  | bùshí 布什 Bush | zǒngtǒng 总统 President | lái 来 come to | huá 华 China | fǎngwèn 访问 visit | biǎoshì 表示 express | rèliè 热烈 warm  | huānyíng 欢迎 welcome |              |                |
| k=3   |             |               |           |             | Jiang Zeming      |             |           | expressed       | welcome        | President Bush | to              | visit to     | China          |
| k=3†  |             |               |           |             | Jiang Zeming      | meets       |           | President Bush  | in China       | 's            | 's              | bid to visit | China          |

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | |
|---|---|---|---|---|---|---|---|---|---|---|---|---|---|---|---|---|---|---|---|---|---|---|---|---|
| | Bùshí | hái | biǎoshì | , | yīng | Bājīsītǎn | hé | Yìndù | zhèngfǔ | de | yāoqǐng | , | tā | jiāng | yú | 3 yuè | fèn | duì | Bājīsītǎn | hé | Yìndù | jìnxíng | fǎngwèn | |
| | 布什 | 还 | 表示 | ， | 应 | 巴基斯坦 | 和 | 印度 | 政府 | 的 | 邀请 | ， | 他 | 将 | 于 | 3月 | 份 | 对 | 巴基斯坦 | 和 | 印度 | 进行 | 访问 | |
| | Bush | also | said | , | at | Pakistan | & | India | govt | 's | invite | , | he | will | in | March | | to | Pakistan | & | India | do | visit | |
| k=1 | bush | also | said | that | at | the | invit. | | of | the | pak. | & | ind. govts | , | he | will | visit | | pak. | & | ind. | in | mar. | |
| k=3 | bush | also | said | that | at | the | invit. | | of | the | pak. | & | ind. govts | , | he | will | pay | | a | state | visit | to pak. & ind. in mar. | | |
| k=3† | bush | also | said | that at the | | | invit. | | of the pak. & ind. govts,he | | | | | | | | will pay | | a | state | visit | to pak. & ind. in mar. | | |
| k=∞ | | | | | | | | | | | | | | | | | | | | | | | | |

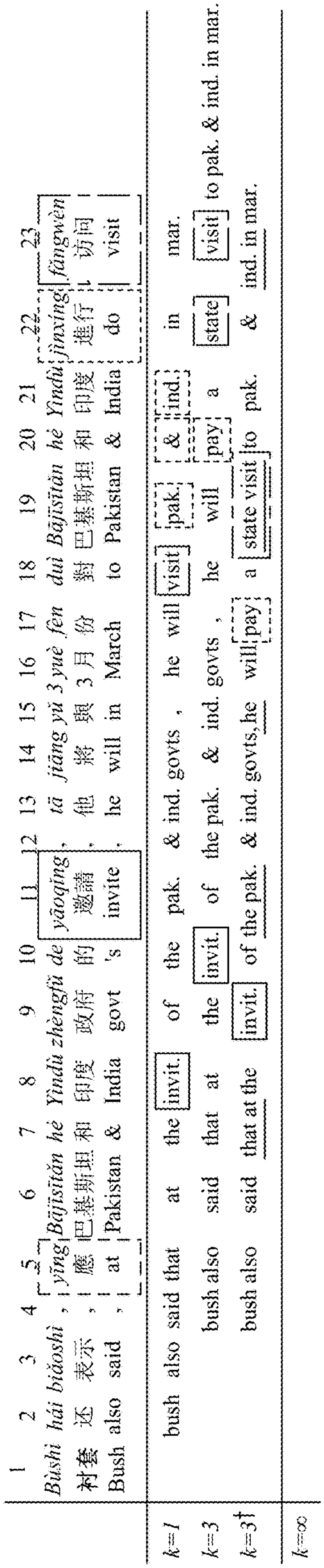

FIG. 21

| | 1 | 2 | 3 | 4 | 5 | 6 | 7 | 8 | 9 | 10 | |
|---|---|---|---|---|---|---|---|---|---|---|---|
| (a) | *Měiguó* 美國 US | *dāngjú* 當局 authorities | *duì* 對 to | *Shātè* 沙特 Saudi | *jìzhě* 記者 reporter | *shīzōng* 失踪 missing | *yī* 一 a | *àn* 按 case | *gǎndào* 感到 feel | *dànyòu* 但又 concern | |
| $k=3$ | | | | the | us | authorities | are | very | concerned | about | the saudi reporter's missing case |
| $k=3^{\dagger}$ | | | | the | us | authorities are | very | concerned | about | the | saudi reporter's missing case |
| $k=\infty$ | | | | | | | | | | | us authorities concerned over saudi journalists missing |
| (b) | 美國 | 當局 | 對 | 沙特 | 記者 | 失踪 | 一 | 按 | 感到 | *bùmǎn* 不滿 | |
| $k=3$ | | | | the | us | authorities | are | very | concerned | about | the saudi reporter's missing case |
| $k=3^{\dagger}$ | | | | | | the | us | authorities | have | expressed | **dissatisfaction** with the incident of saudi arabia's missing reporters |
| $k=\infty$ | | | | | | | | | | | us authorities dis-satisfied with saudi reporter's missing case |

FIG. 22

TABLE 2A

| de→en test | *k* | 1 | | 3 | | 5 | | 7 | | 9 | | ∞ | |
|---|---|---|---|---|---|---|---|---|---|---|---|---|---|
| Transformer wait-*k* | AP | 0.59 | *0.58* | 0.65 | *0.64* | 0.70 | *0.70* | 0.75 | *0.75* | 0.79 | *0.79* | 1 | |
| | AL | 1.4 | *1.2* | 3.2 | *3.1* | 5 | *4.9* | 6.7 | *6.7* | 8.4 | *8.4* | 28.6 | |
| | 1-ref BLEU | 19.38 | *19.36* | 24.07 | *24.05* | 26.38 | *26.31* | 27.63 | *27.68* | 28.39 | *28.52* | 29.92 | *30.69* |
| RNN wait-*k* | AP | 0.56 | *0.55* | 0.63 | *0.62* | 0.69 | *0.68* | 0.74 | *0.73* | 0.78 | *0.77* | 1 | |
| | AL | 0.67 | *0.26* | 2.9 | *2.5* | 5.1 | *4.7* | 7 | *6.7* | 8.9 | *8.7* | 28.6 | |
| | 1-ref BLEU | 12.59 | *12.47* | 17.32 | *17.31* | 20.39 | *20.32* | 21.55 | *21.61* | 22.69 | *22.87* | 23.19 | *24.42* |

| en→de test | *k* | 1 | | 3 | | 5 | | 7 | | 9 | | ∞ | |
|---|---|---|---|---|---|---|---|---|---|---|---|---|---|
| Transformer wait-*k* | AP | 0.57 | *0.57* | 0.64 | *0.63* | 0.70 | *0.70* | 0.76 | *0.76* | 0.80 | *0.80* | 1 | |
| | AL | 1.6 | *1.5* | 3.3 | *3.2* | 5.20 | *5.2* | 7.0 | *7.0* | 8.8 | *8.8* | 26.6 | |
| | 1-ref BLEU | 16.73 | *17.13* | 21.97 | *22.33* | 24.52 | *24.82* | 26.0 | *26.13* | 26.65 | *26.79* | 26.63 | *27.44* |
| RNN wait-*k* | AP | 0.58 | *0.56* | 0.64 | *0.63* | 0.71 | *0.7* | 0.76 | *0.75* | 0.81 | *0.80* | 1 | |
| | AL | 1.7 | *1.4* | 3.6 | *3.3* | 5.4 | *5.1* | 7.2 | *6.9* | 9.2 | *8.9* | 26.6 | |
| | 1-ref BLEU | 11.94 | *12.57* | 16.1 | *16.79* | *17.88* | *18.72* | 18.49 | *19.44* | 18.45 | *19.58* | 19.76 | *20.82* |

FIG. 25A

TABLE 2B

| zh→en test | *k* | 1 | | 3 | | 5 | | 7 | | 9 | | ∞ | |
|---|---|---|---|---|---|---|---|---|---|---|---|---|---|
| Transformer wait-*k* | AP | 0.60 | *0.59* | 0.67 | *0.67* | 0.73 | *0.73* | 0.77 | *0.78* | 0.82 | *0.82* | 1 | |
| | AL | 2.9 | *2.7* | 5.0 | *5.0* | 6.9 | *8.3* | 8.3 | *8.5* | 10.5 | *10.5* | 28.7 | |
| | 4-ref BLEU | 25.79 | *26.02* | 29.45 | *29.45* | 31.62 | *31.74* | 31.74 | *32.55* | 34.39 | *34.39* | 36.29 | *38.34* |
| Transformer wait-*k* + *decoder catchup* | AP | 0.53 | *0.52* | 0.6 | *0.6* | 0.66 | *0.73* | 0.73 | *0.72* | 0.78 | *0.78* | 1 | |
| | AL | 0.54 | *0.29* | 2.3 | *2.3* | 3.8 | *6.3* | 6.3 | *5.9* | 8.2 | *8.2* | 28.7 | |
| | 4-ref BLEU | 19.95 | *20.32* | 24.85 | *24.85* | 27.66 | *30.56* | 30.56 | *30.51* | 31.29 | *31.29* | 36.29 | *38.34* |

| en→zh test | *k* | 1 | | 3 | | 5 | | 7 | | 9 | | ∞ | |
|---|---|---|---|---|---|---|---|---|---|---|---|---|---|
| Transformer wait-*k* + *encoder catchup* | AP | 0.52 | *0.53* | 0.59 | *0.59* | 0.64 | *0.65* | 0.69 | *0.69* | 0.73 | *0.73* | 1 | |
| | AL | 0.39 | *0.56* | 2.6 | *2.7* | 4.50 | *4.6* | 6.3 | *6.3* | 8.1 | *8.1* | 38.3 | |
| | 1-ref BLEU | 9.37 | *9.41* | 12.62 | *12.61* | 14.4 | *14.56* | 15.7 | *16.39* | 16.22 | *16.99* | 18.65 | *19.56* |

FIG. 25B

SYSTEMS AND METHODS FOR SIMULTANEOUS TRANSLATION WITH INTEGRATED ANTICIPATION AND CONTROLLABLE LATENCY (STACL)

CROSS REFERENCE TO RELATED PATENT APPLICATIONS

The present application claims priority benefit, under 35 U.S.C. § 119(e), to commonly-assigned U.S. Patent Application No. 62/738,367, filed on Sep. 28, 2018, entitled "Predictive Simultaneous Translation with Arbitrary Latency Constraints," listing Mingbo Ma, Liang Huang, Hao Xiong, Chuanqiang Zhang, Zhongjun He, Kaibo Liu, Hairong Liu, Xing Li, and Haifeng Wang as inventor, which application is herein incorporated by reference as to its entire content. Each reference mentioned in this patent document is incorporated by reference herein in its entirety.

BACKGROUND

The present disclosure relates generally to systems and methods for interpretation automation. More particularly, the present disclosure relates to systems and methods for simultaneous translation with integrated anticipation and controllable latency.

Simultaneous translation aims to automate simultaneous interpretation, which translates concurrently with the source-language speech, with a delay of only a few seconds. This additive latency is much more desirable than the multiplicative 2× slowdown in consecutive interpretation. With this appealing property, simultaneous interpretation has been widely used in many scenarios including multilateral organizations (United Nations/European Union), and international summits (Asia-Pacific Economic Cooperation/G20). However, due to the concurrent comprehension and production in two languages, it is extremely challenging and exhaustive for humans: the number of qualified simultaneous interpreters worldwide is very limited, and each can perform only for about 15-30 minutes in one turn as error rates grow exponentially just after minutes of interpreting. Moreover, limited memory forces human interpreters to routinely omit source content. Therefore, there is a critical need for simultaneous machine translation techniques that reduce the burden on human interpreters and make simultaneous translation more accessible and affordable.

Unfortunately, simultaneous translation is also notoriously difficult for machines, due in large part to the diverging word order between the source and target languages. For example, to simultaneously translate a Subject-Verb-Object (SOV) language, such as Japanese or German, to a Subject-Object-Verb (SVO) language, such as English or Chinese (technically, German is SOV+V2 in main clauses, and SOV in embedded clauses; Mandarin is a mix of (SVO+SOV): one has to know, i.e., wait for, the source language verb. As a result, existing so-called "real-time" translation systems resort to conventional full-sentence translation, causing an undesirable latency of at least one sentence.

Noticing the importance of verbs in SOV-to-SVO translation, some approaches attempt to reduce latency by explicitly predicting the sentence-final German or English verbs, which is limited to this particular case, or unseen syntactic constituents, which requires incremental parsing on the source sentence. Some have proposed to translate on an optimized sentence segment level to improve translation accuracy.

Others use a two-stage model whose base model is a full-sentence model. On top of the full-sentence model, the two-stage model uses a READ/WRITE (R/W) model to decide, at every step, whether to wait for another source word (READ) or to emit a target word using the pre-trained base model (WRITE). This R/W model is trained by reinforcement learning to prefer (rather than enforce) a specific latency, without updating the base model. However, such approaches all have two major limitations in common: (a) they cannot achieve any predetermined latency, such as, e.g., a 3-word delay; (b) their base translation model is still trained on full sentences; and (c) their systems are overcomplicated, involving many components (such as pretrained model, prediction, and reinforcement learning) and are difficult to train.

Therefore, it would be desirable to have simultaneous translation that integrates anticipation and translation.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

FIG. 8 is a flowchart of an illustrative process for preventing a translation delay from increasing over time, according to various embodiments of the present disclosure.

FIG. 18-FIG. 23 illustrate real running examples that have been generated from the introduced model(s) and baseline framework to demonstrate the effectiveness of the disclosed systems, according to various embodiments of the present disclosure.

FIG. 25A-FIG. 25B depict respective tables 2A and 2B showing performance data of wait-k with Transformer, its catchup version, and wait-k with RNN models with various k on the de↔en and zh↔en test sets, according to various embodiments of the present disclosure.

DETAILED DESCRIPTION OF EMBODIMENTS

Figure 1:
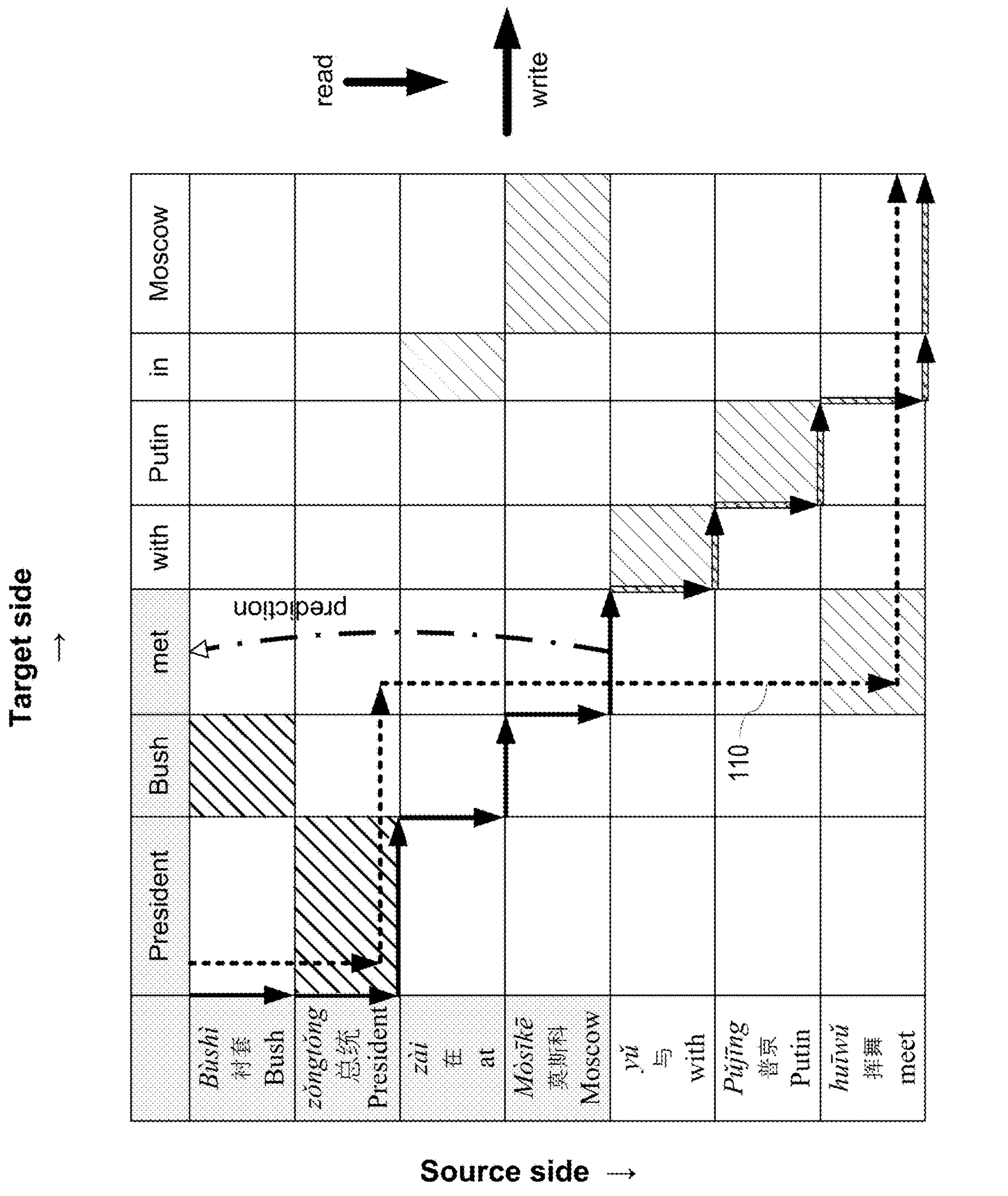
FIG. 1 illustrates a wait-k model according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Further, it shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. All documents cited herein are incorporated by reference herein in their entirety.

Furthermore, it shall be noted that many embodiments described herein are given in the context of audio recordings, but one skilled in the art shall recognize that the teachings of the present disclosure are not limited to audio applications and may equally be used to create and consolidate video content and may also be extended to include classification of objects or people in the video, motion, location, time, and other parameters.

A. Overview

In this document, "word" refers to any part of a word or a language token from which a meaning may be derived. The term "simultaneous" means "in real-time" as understood by a person of skill in the relevant art, e.g., a simultaneous interpreter, i.e., simultaneous is not limited to the common meaning of "exactly at the same time."

Presented herein are very simple yet effective solutions that take advantage of a novel prefix-to-prefix framework that predicts target words using, e.g., only prefixes of the source sentence. Within this framework is presented a simple wait-k policy whose translation is, e.g., always k words behind the input. Considering the Chinese-to-English example in FIG. 1 and FIG. 2, where the sentence-final Chinese verb huìwì ("meet") needs to be translated earlier to avoid a long delay. A wait-2 model correctly anticipates the English verb given only the first 4 Chinese words (which provide enough clues for this prediction given many similar prefixes in the training data). The presented embodiments make the following contributions:

(1) a prefix-to-prefix framework tailored to simultaneous translation and trained from scratch without requiring full-sentence models. The framework seamlessly integrates implicit anticipation and translation in a single model by directly predicting target words without first predicting source words and then translating the source words into target words.

(2) a special case "wait-k" policy that can satisfy any latency requirements;

(3) the presented strategies may be applied to most sequence-to-sequence model, e.g., with relatively minor changes; an application is demonstrated on Recurrent Neural Network (RNN) and Transformer;

(4) a new latency metric, called "Averaged Lagging," addresses deficiencies of previous metrics; and (5) experiments demonstrate that the strategy achieves low latency and reasonable BLEU scores (compared to full-sentence translation baselines) in four directions: Chinese↔English and German↔English.

B. Preliminaries: Full-Sentence Neural Machine Translation (NMT)

The following brief review of standard (full-sentence) neural translation sets up some of the notations.

Regardless of the particular design of different seq-to-seq models, the encoder always takes the input sequence $x=(x_1, \ldots, x_n)$ where each $x_i \in \mathbb{R}^{d_x}$ is a word embedding of dimensions, and produces a new sequence of hidden states $h=f(x)=(h_1, \ldots, h_n)$. The encoding function $f$ can be implemented by RNN or Transformer.

On the other hand, a (greedy) decoder predicts the next output word $y_t$ given the source sequence (actually its representation h) and previously generated words, denoted $y_{<t}=(y_1, \ldots, y_{t-1})$ The decoder stops when it emits an end-of-sentence signal (e.g., <eos>), and the final hypothesis $y=(y_1, \ldots, \text{<eos>})$ has a probability $$p(y|x)=\Pi_{t=1}^{|y|} p(y_t|x,y_{<t}) \quad \text{(Eq. 1)}$$

At training time, the conditional probability of each ground-truth target sentence y* may be maximized given input x over the whole training data D, or equivalently minimizing the following loss:

$$\ell(D)=\Sigma_{(x,y^*)\in D} \log p(y^*|x) \quad \text{(Eq. 2)}$$

C. Prefix-to-Prefix and Wait-k Policy

In full-sentence translation, discussed above, each $y_i$ is predicted using the entire source sentence x. But in simultaneous translation, one translates concurrently with the (growing) source sentence. Therefore, certain embodiments enable the design of a new prefix-to-prefix architecture to (be trained to) predict words in a target sentence by using a source prefix.

1. Prefix-to-Prefix Architecture

Let g(t) be a monotonic non-decreasing function of t that denotes the number of source words processed by an encoder when deciding the target word $y_t$. For example, in FIG. 1 and FIG. 2, g(3)=4, i.e., a 4-word Chinese prefix is used to predict the target word $y_3$="met." In embodiments, the source prefix $(x_1, \ldots, x_g(t))$ rather than the whole input x may be used to predict the target word $y_t$:

$$p(y_t|x_{\leq g(t)},y_{<t})$$

Therefore, the decoding probability may be expressed as:

$$p_g(y|x)=\Pi_{t=1}^{|y|} p(y_t|x_{\leq g(t)},y_{<t}) \quad \text{(Eq. 3)}$$

and given training D, the training objective may be expressed as:

$$\ell_g(D)=-\Sigma_{(x,y^*)\in D} \log p_g(y^*|x) \quad \text{(Eq. 4)}$$

Generally speaking, g(t) may be used to represent any arbitrary policy. In two special cases, g(t) may be constant: (a) g(t)=|x|: baseline full-sentence translation; (b) g(t)=0: an "oracle" that does not rely on any source information. It is noted that in any case, 0≤g(t)≤|x| for all t.

In embodiments, the "cut-off" step, $\tau_g(|x|)$, may be defined as the decoding step when the source sentence finishes, e.g., as:

$$\tau_g(|x|)=\min\{t|g(t)=|x|\} \quad \text{(Eq. 5)}$$

Figure 2:
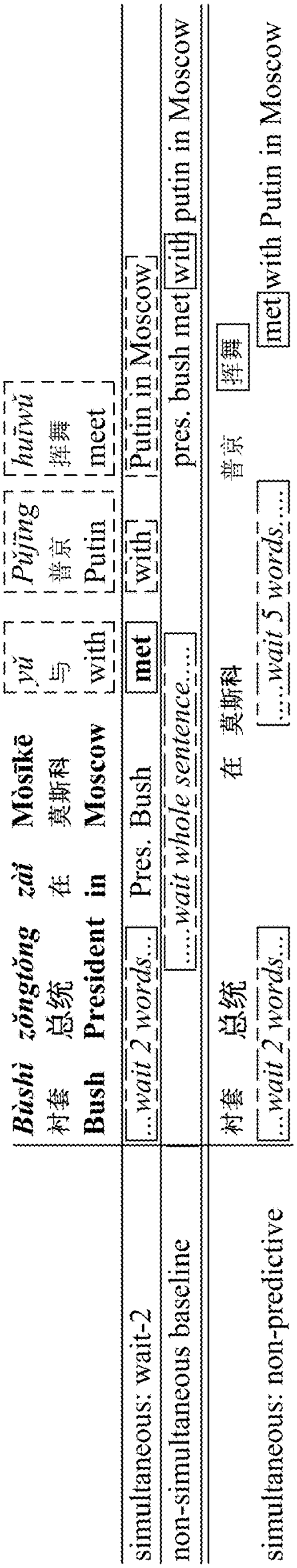
FIG. 2 is a different illustration of the wait-k model shown in FIG. 1.

For example, in FIG. 1 and FIG. 2 that illustrate a wait-k model according to various embodiments of the present disclosure, the cut-off step is 6, i.e., the Chinese sentence finishes right before $y_6$="in." In Example, in FIG. 1, the wait-k model outputs each target word $y_t$ given source-side prefix $x_1 \ldots x_{t+k-1}$, often before seeing the corresponding source word (here k=2, outputting $y_3$="met" before $x_7$="*huìwù*"). Without anticipation, a 5-word wait 110 is needed.

FIG. 2 is a different illustration of the wait-k model shown in FIG. 1. FIG. 2 highlights the step of outputting the English verb "met," which corresponds to the sentence-final *huìwù* Chinese verb *huìwù*. Unlike a simultaneous translator without anticipation, which would have to wait 5 words, the wait-k policy (here k=2) translates concurrently with the source sentence, but k words behind. The model correctly predicts the English verb given just the first 4 Chinese words (in bold) that literately translate to "Bush president in Moscow."

While most existing approaches in simultaneous translation might be viewed as special cases of the presented framework, only their decoders are prefix-to-prefix, and their training still relies on a full-sentence-based approach. In other words, existing approaches use a full-sentence translation model to perform simultaneous decoding, which is a mismatch between training and testing. In contrast, various embodiments train a model to predict using source prefixes.

In embodiments, prefix-to-prefix training implicitly learns anticipation and, advantageously, overcomes word-order differences, such as SOV→SVO. Using the example in FIG. 1 and FIG. 2, in embodiments, anticipation of the English verb is enabled due to the training data comprising numerous prefix-pairs in the form of (X zài Y . . . , X met . . . ). Therefore, although the prefix x≤4 "*Bùshí* *zǒngtǒng* zài *Mòskiē*" (literally meaning "Bush president in Moscow") does not contain a verb, the prefix nevertheless provides sufficient clues to predict the verb "met."

2. Wait-k Policy

As an example within the prefix-to-prefix framework a wait-k policy is presented that, in embodiments, first waits k source words, and then translates concurrently with the rest of source sentence, i.e., the output is k words behind the input, i.e., similar to human simultaneous interpretation that generally starts a few seconds into the speakers' speech and ends a few seconds after the speaker finishes.

Figure 3:
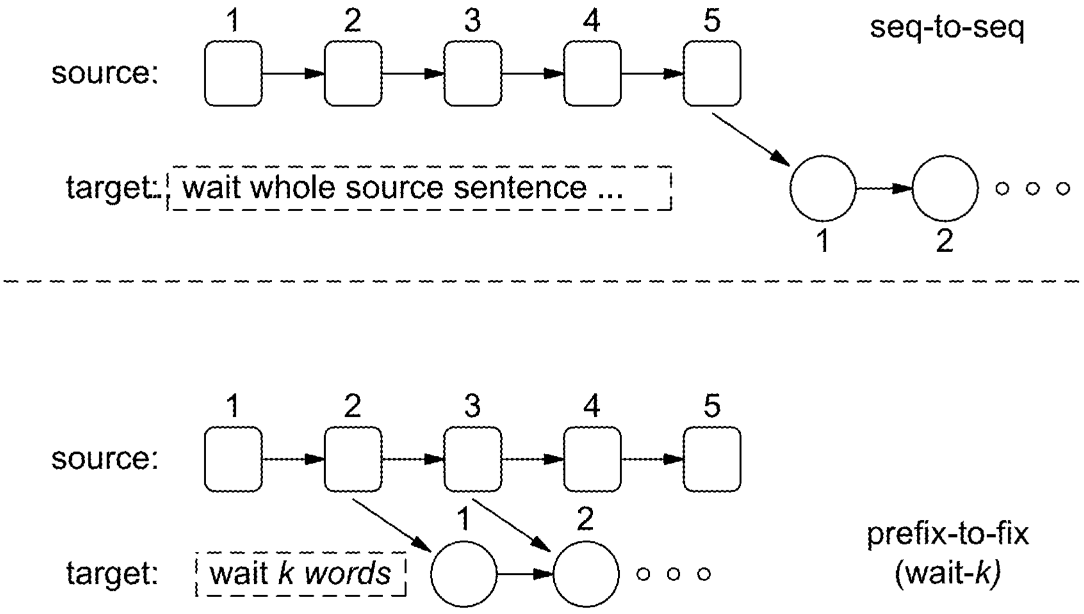
FIG. 3 is a comparison between a common sequence-to-sequence (seq-to-seq) framework and a prefix-to-prefix framework, according to embodiments of the present disclosure.

FIG. 3 is a comparison between a common seq-to-seq framework and a prefix-to-prefix framework according to embodiments of the present disclosure. The prefix-to-prefix framework example shows a wait-2 policy as an example. As demonstrated in example in FIG. 3, assuming k=2, the first target word may be predicted using the first 2 source words, and the second target word may be predicted using the first 3 source words, etc. More formally, its g(t) may be defined as:

$$g_{wait\text{-}k}(t)=\min\{k+t-1,|x|\} \quad \text{(Eq. 6)}$$

In embodiments, for this policy, the cut-off point $\tau_{g_{wait\text{-}k}}(|x|)$ is |x|−k. From this step on, $g_{wait\text{-}k}(t)$ may be fixed to |x|, i.e., the remaining target words (including this step) may be generated using the full source sentence. This part of the output, $y_{\geq|x|-k}$, may be referred to as the “tail,” discussed in greater detail with reference to FIG. 8.

Figure 4:
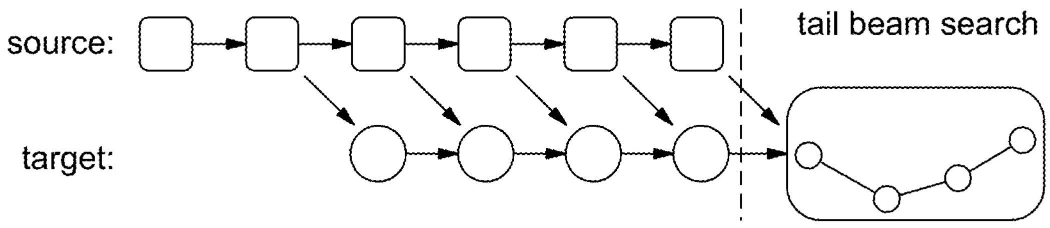
FIG. 4 illustrates tail beam search according to various embodiments of the present disclosure.

In embodiments, beam search may be performed on the tail (referred herein as “tail beam search”), but all earlier words may be generated greedily one by one. FIG. 4 illustrates tail beam search according to various embodiments of the present disclosure. As shown in FIG. 4, tail beam search may occur after the entire source sentence is finished. A general prefix-to-prefix policy, however, may use beam search whenever g(t)=g(t−1), i.e., predicting more than one word using the same input prefix (e.g., the tail in wait-k).

Implementation details further below describe two exemplary implementations of the general prefix-to-prefix policy using RNN and Transformer as the underlying models.

Figure 5:
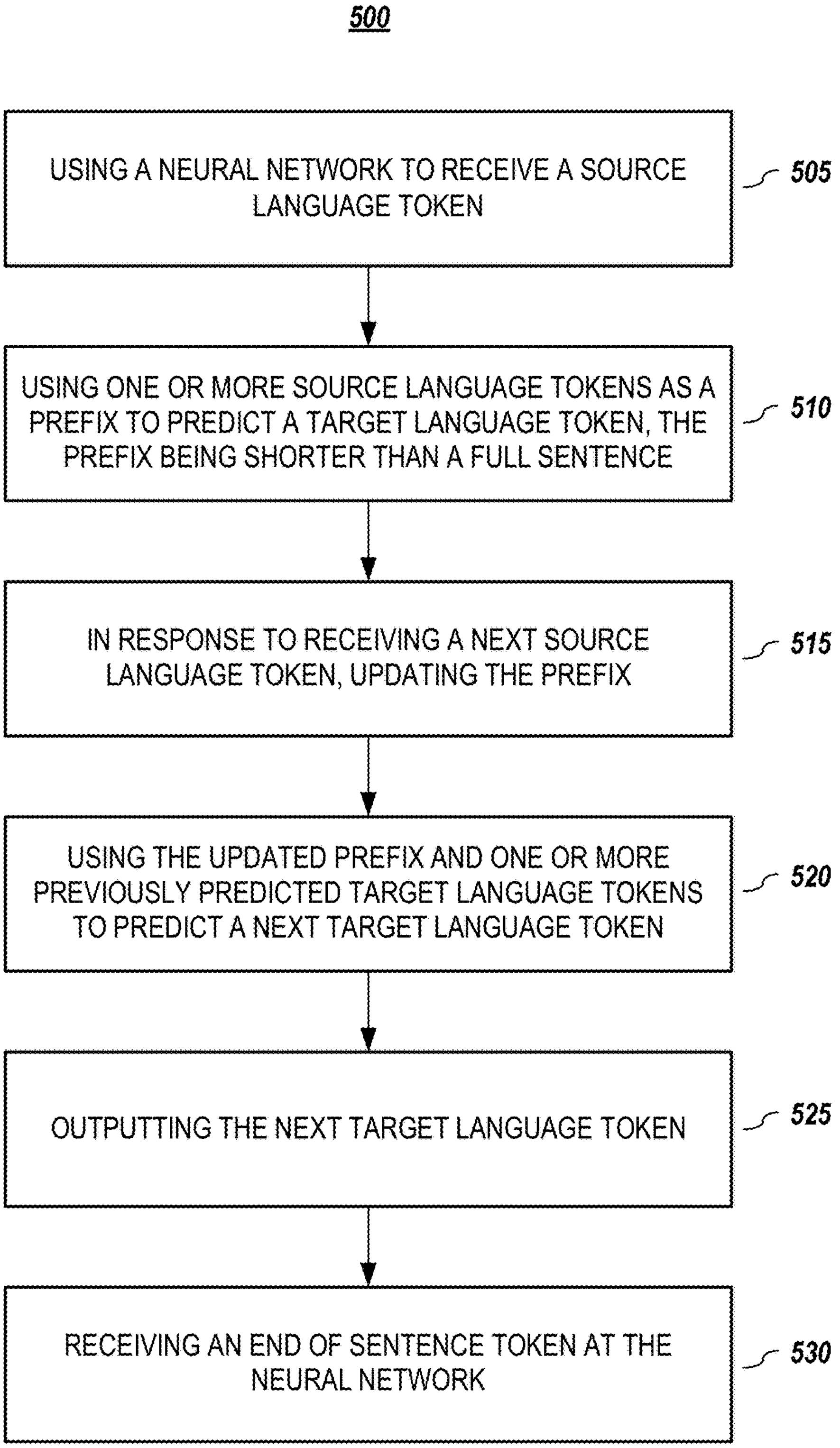
FIG. 5 is a flowchart of an illustrative process for using a neural network that has been trained in a prefix-to-prefix manner for low-latency real-time translation, according to various embodiments of the present disclosure.

FIG. 5 is a flowchart of an illustrative process for using a neural network that has been trained in a prefix-to-prefix manner for low-latency real-time translation, according to various embodiments of the present disclosure. In embodiments, process 500 starts by using a neural network that has been trained in a prefix-to-prefix manner to receive a source language token (505). The neural network may be trained by using a sequence of source language words that is shorter than a sentence and one or more previously generated target language words to predict some or all target language words corresponding to the sentence.

In embodiments, the source language tokens may be used as a prefix (510) that is shorter than a complete sentence to predict a target language token.

In response to receiving a next source language token (515), the prefix may be updated, and the updated prefix and one or more previously predicted target language tokens may be used to predict (520) a next target language token that is then output (525).

Finally, in response to receiving an end-of-sentence signal, substantially all source language tokens in a sentence may be used to generate (530) any remaining target language tokens, e.g., at once.

Figure 6:
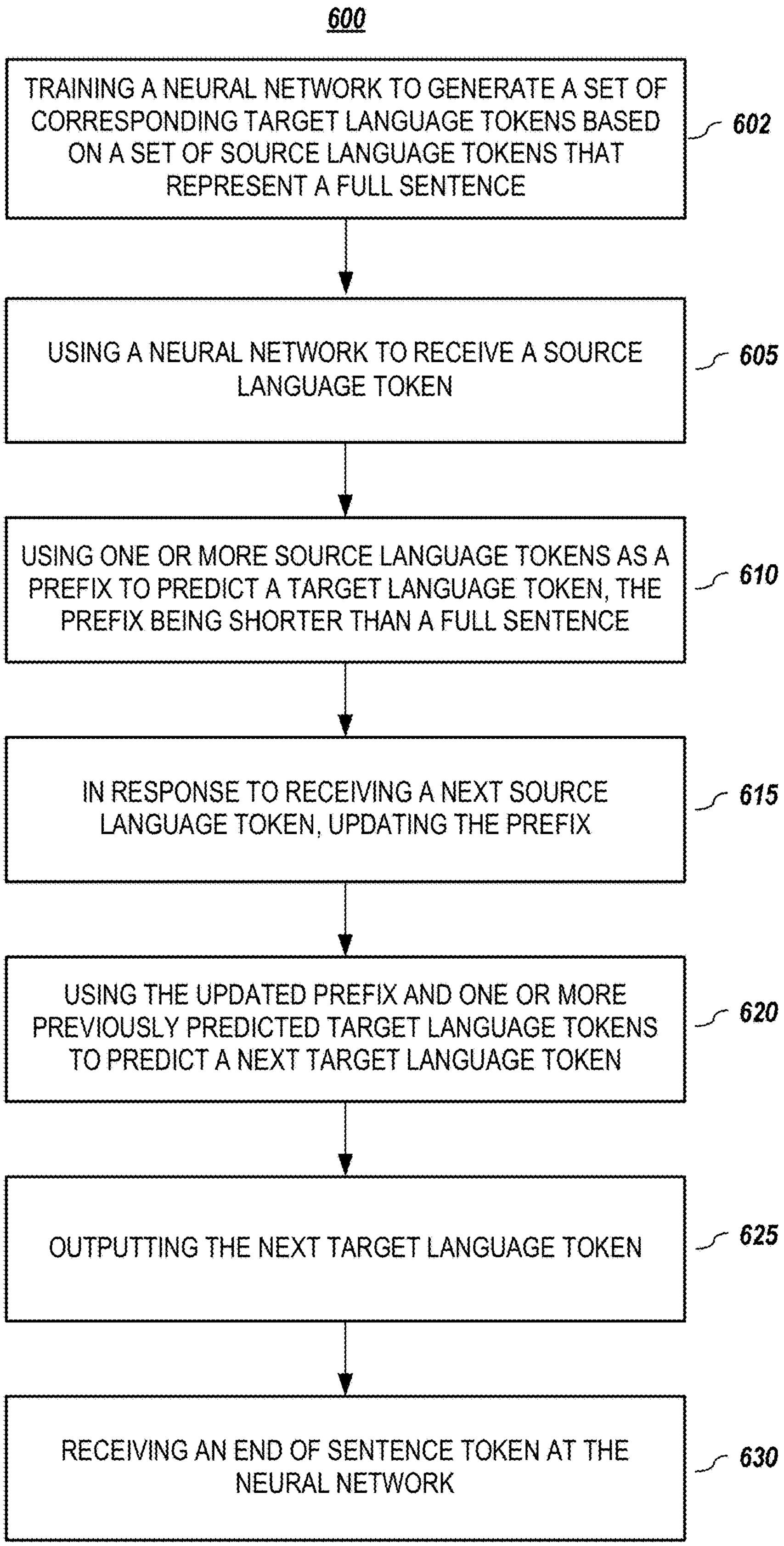
FIG. 6 is a flowchart of an illustrative process for using a neural network that has been trained on a full sentence manner for low-latency real-time translation in a prefix-to-prefix manner, according to various embodiments of the present disclosure.

FIG. 6 is a flowchart of an illustrative process for using a neural network that has been trained in a full sentence manner for low-latency real-time translation in a prefix-to-prefix manner, according to various embodiments of the present disclosure. In embodiments, process 500 starts by training (602) a neural network to generate a set of corresponding target language tokens based on a set of source language tokens that represent a complete sentence.

The neural network is used to receive a first set (605) of source language tokens associated with a sentence.

One or more of the first set of source language tokens are used as a prefix (610) to predict a first set of target language tokens, wherein the prefix is shorter than the sentence.

In response to receiving a second set of source language tokens, the prefix is updated (615) and used together with one or more previously predicted target language tokens to predict a second set (620) of target language tokens and output (625) one or more target language tokens. Finally, responsive to receiving an end-of-sentence signal, using substantially all source language tokens in the sentence to generate (625) any remaining target language tokens at once.

Test-Time Wait-k. As an example of a test-time prefix-to-prefix implementation discussed in the above subsection, various embodiments implement a “test-time wait-k” method, i.e., using a full-sentence model but decoding it with a wait-k policy. Experiments demonstrate that an embodiment of this method, without the anticipation capability, performs worse than implementations that utilize a genuine wait-k policy when k is small, but gradually improves in accuracy, and eventually both methods approach the full-sentence baseline (k=∞).

D. Refinement: Wait-k with Catchup

As previously mentioned, the wait-k decoding lags k words behind the incoming source stream. In the ideal case where the input and output sentences have equal length, the translation finishes k steps after the source sentence finishes, i.e., the tail length is also k. This is consistent with human interpretation, which starts and stops a few seconds after the speaker starts and stops.

Figure 7B:
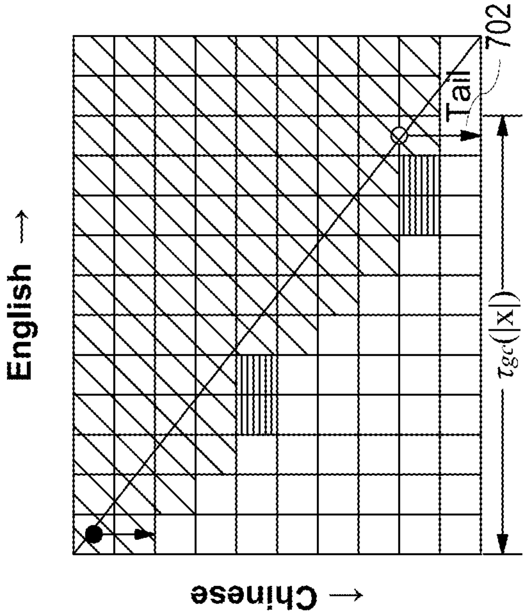
FIG. 7B illustrates how a wait-2 policy with catchup, according to various embodiments of the present disclosure, shrinks the tail and stays closer to the ideal diagonal thus reducing effective latency.
Figure 7A:
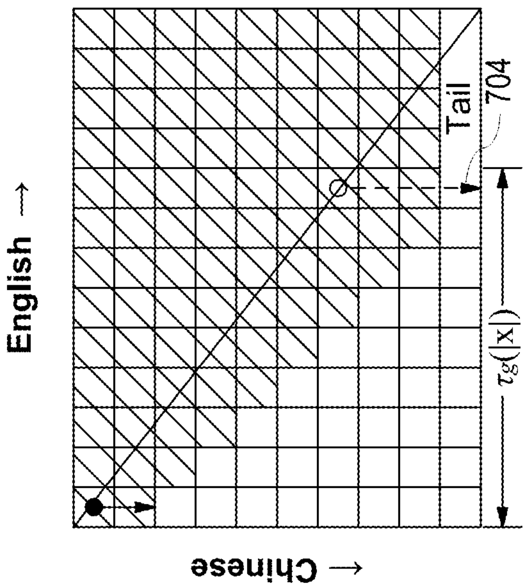
FIG. 7A illustrates how a wait-2 policy renders a user increasingly out of sync with a speaker.

However, input and output sentences generally have different lengths. In some directions, such as from Chinese to English, the target side is oftentimes significantly longer than the source side, with an average ground truth tgt/src ratio, $r=\overline{|y^*|/|x|}$, of about 1.25. In this case, if the vanilla wait-k policy is followed, the tail length will be 0.25|x|+k, which increases with input length. For example, given a 20-word Chinese input sentence, the tail of wait-3 policy will be 8 words long, i.e., almost half of the source length. This has two main negative effects:

(a) as decoding progresses, the user will effectively lag further and further behind (with each Chinese word practically translating to 1.25 English words), thus, rendering the user more and more out of sync with the speaker, as illustrated by FIG. 7A for a wait-2 policy (the diagonal line denotes an ideal, i.e., perfect synchronization); and (b) once a source sentence finishes, the rather long tail is displayed all at once, thus, causing a cognitive burden on the user. In one or more embodiments, the tail may in principle be displayed concurrently with the first k words of the next sentence, but the tail is now much longer than k. Such negative effects worsen for longer input sentences. To address this problem, certain embodiments utilize a “wait-k+catchup” policy, such that the user is still k words behind the input in terms of real information content, i.e., k source words behind the ideal perfect synchronization policy denoted by the diagonal line in FIG. 7B.

FIG. 7B illustrates how a wait-2 policy with catchup according to various embodiments of the present disclosure shrinks the tail and stays closer to the ideal diagonal, thereby, reducing the effective latency. Arrows 502 and 504 illustrate respective 2 and 4 word-lags behind the diagonal line. For example, assuming that the tgt/src ratio is r=1.25, then 5 target words may be output for every 4 source words; i.e., the catchup frequency, denoted as c=r−1, is 0.25.

More formally, using catchup frequency c, the new policy may be expressed as:

$$g_{wait\text{-}k,c}(t)=\min\{k+t-1-\lfloor ct\rfloor,|x|\} \quad \text{(Eq. 7)}$$

and decoding and training objectives may change accordingly. It is noted that, in embodiments, the model may be trained to catchup using this new policy.

On the other hand, when translating from longer source sentences to shorter targets, e.g., from English to Chinese, it is possible that the decoder finishes generation before the encoder sees the entire source sentence, thus, ignoring the "tail" on the source side. Therefore, in embodiments, "reverse" catchup is employed, i.e., catching up on the encoder instead of the decoder. For example, in English-to-Chinese translation, one extra word may be encoded every 4 steps, i.e., encoding 5 English words per 4 Chinese words. In this case, the "decoding" catchup frequency $c=r-1=-0.2$ is negative but Eq. 7 still holds. It is noted that any arbitrary c, e.g., $c=0.341$, may be used where the catchup pattern is not as easy as "1 in every 4 steps," but still maintains roughly a frequency of c catchups per source word.

E. New Latency Metric: Average Lagging

Besides translation quality, latency is another crucial aspect for evaluating simultaneous translation. Existing latency metrics are reviewed, next, and their limitations are highlighted. Then a new latency metric that address these limitations is introduced.

1. Existing Metrics: CW and AP

Consecutive Wait (CW) commonly denotes the number of source words waited between two target words. Based on the notation herein, for a policy g(•), the per-step CW at step t is $$CW_g(t)=g(t)-g(t-1)$$

The CW of a sentence-pair (x, y) is the average CW over all consecutive wait segments:

$$CW_g(x, y) = \frac{\sum_{t=1}^{|y|} CW_g(t)}{\sum_{t=1}^{|y|} 1 CW_g(t) > 0} = \frac{|x|}{\sum_{t=1}^{|y|} 1_{CW_g(t)>0}}$$

In other words, CW measures the average lengths of consecutive wait segments (the best case is 1 for word-by-word translation, or wait-1, and the worst case is |x| for full-sentence MT). The drawback of CW is its insensitivity to the actual lagging behind, as discussed in the previous section; for example, catchup has no effect on CW.

Another existing latency measurement, Average Proportion (AP), measures the proportion of the shaded area for a policy in FIG. 7:

$$AP_g(x, y) = \frac{1}{|x||y|} \sum_{t=1}^{|y|} g(t) \quad \text{(Eq. 8)}$$

AP has two major flaws: First, it is sensitive to input length. For example, considering the wait-1 policy. When $|x|=|y|=1$, AP is 1, and when $|x|=|y|=2$, AP is 0.75, and eventually AP approaches 0.5 when $|x|=|y|\rightarrow\infty$. However, in all these cases, there is a one-word delay, so AP is not fair between long and short sentences. Second, being expressed as a percentage, the actual delay in number of words is not obvious to the user.

FIG. 8 is a flowchart of an illustrative process for preventing a translation delay from increasing over time, according to various embodiments of the present disclosure. Process 800 comprises training a prefix-to-prefix neural network to adjust (805) the difference between a number of target and source language tokens to keep their ratio about the same. In embodiments, this may be accomplished by adding or subtracting, on average, a constant number of source language tokens to prevent a translation delay from increasing over time.

In embodiments, the ratio may be inverted, e.g., when interpreting in a reverse direction (810).

2. New Metric: Average Lagging

Figure 9B:
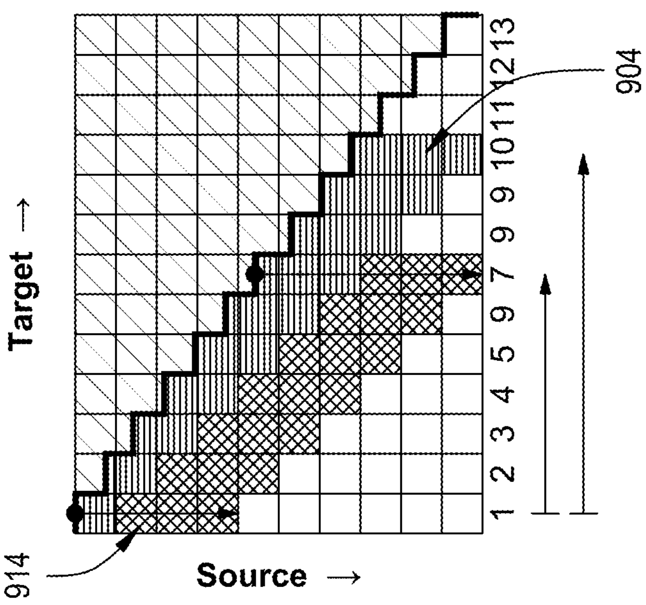
FIG. 9A and FIG. 9B illustrate an Average Lagging latency metric according to various embodiments of the present disclosure.
Figure 9A:
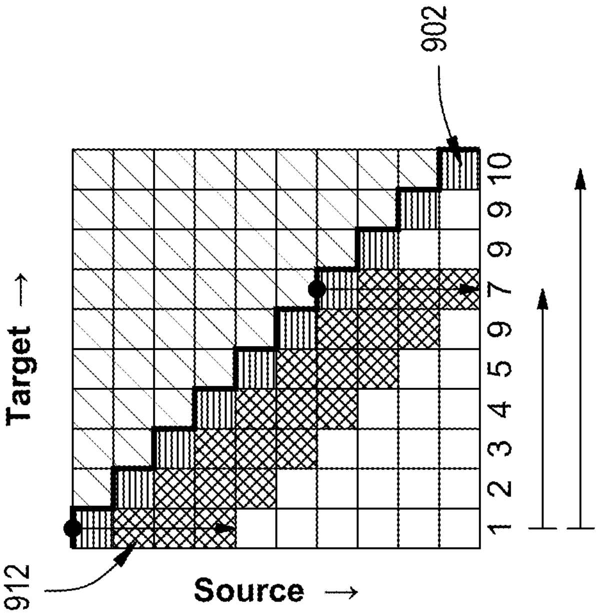

Based on the concept of "lagging behind the ideal policy" discussed with respect to FIGS. 7A and 7B, a new metric, called "average lagging" (AL), is introduced and illustrated in FIG. 9A for the simple case when $|x|=|y|$ and FIG. 9B for the more general case when $|x|\neq|y|$.

In embodiments, AL may be used to quantify the degree a user is out of sync with a speaker, in terms of the number of source words. For simplicity, FIG. 9A shows a special case when $|x|=|y|$. The thick line indicates a "wait-0" policy where the decoder is one word ahead of the encoder. This policy may be defined as having an AL of 0. Policy 602, 604, 902, 904 indicates a "wait-1" policy where the decoder lags one word behind the wait-0 policy. In this case, the policy's AL may be defined as 1. The policy 212, 614, 912, 914 indicates a "wait-4" policy where the decoder lags 4 words behind the wait-0 policy, so its AL is 4. It is noted that in both cases, we only count up to (and including) the cut-off point (indicated by horizontal arrows 630, 631 and 640, 641, respectively, i.e., 10 and 7, respectively) because the tail may be generated instantly without further delay. More formally, for the ideal case where $|x|=|y|$, one may define $$AL_g(x, y) = \frac{1}{\tau_g(|x|)} \sum_{t=1}^{\tau_g(|x|)} g(t) - (t-1) \quad \text{(Eq. 9)}$$

and infer that the AL for wait-k is exactly k.

In more realistic cases, such as the case represented by FIG. 9B when $|x|<|y|$, as explained with respect to FIG. 7, more and more delays may accumulate when the target sentence grows. For example, wait-1 policy 904 in FIG. 9B has a delay of more than 3 words at decoding its cut-off step 10, and wait-4 policy 914 has a delay of almost 6 words at its cut-off step 7. This difference is mainly caused by the tgt/src ratio. In FIG. 9B, there are 1.3 target words per source word. More generally, the "wait-0" policy may be offset and one may redefine:

$$AL_g(x, y) = \frac{1}{\tau_g(|x|)} \sum_{t=1}^{\tau_g(|x|)} g(t) - \frac{t-1}{r} \quad \text{(Eq. 10)}$$

where $\tau_g(|x|)$ denotes the cut-off step, and $r=|y|/|x|$ is the target-to-source length ratio. One can observe that wait-k with catchup has an AL k.

F. Implementation Details

Exemplary implementation details for training prefix-to-prefix with RNN and Transformer are described next.

1. Background: Full-Sentence RNN

The (unidirectional) RNN encoder maps a sequence x into a sequence of hidden states:

$$\vec{h}_i=\text{RNN}(x_i, \vec{h}_{(i-1)}; \theta_e),$$

then list of hidden states h represent the source side. The decoder may take another RNN to generate the target side hidden representations at decoding step t:

$$\vec{s}_t=\text{RNN}(\vec{s}_{(t-1)}, h; \propto_d) \quad \text{(Eq. 11)}$$

2. Training Simultaneous RNN

Unlike full-sentence translation, in simultaneous translation embodiments, the source words may be fed into the encoder one by one. For decoding, Eq. 11 may be modified to predict using source prefix:

$$\vec{s}_t = \text{RNN}(\vec{s}_{(t-1)}, h_{\leq g(t)}; \theta_d)$$

3. Background: Full-Sentence Transformer

First, the Transformer architecture is briefly reviewed step by step to highlight the differences between the conventional Transformer and simultaneous Transformer embodiments. The encoder of Transformer works in a self-attention fashion and takes an input sequence x, and produces a new sequence of hidden states $z=(z_1, \ldots, z_n)$ where $z_i \in \mathbb{R}^{d_z}$ is as follows:

$$z_i = \sum_{j=1}^{n} \alpha_{ij} P_{W_V}(x_j) \qquad \text{(Eq. 12)}$$

Here $P_{W_V}(\bullet)$ is a projection function from the input space to the value space, and $\alpha_{ij}$ denotes the attention weights:

$$\alpha_{ij} = \frac{\exp e_{ij}}{\sum_{l=1}^{n} \exp e_{il}}, \qquad \text{(Eq. 13)}$$

$$e_{ij} = \frac{P_{W_Q}(x_i) P_{W_V}(x_j)^T}{\sqrt{d_x}}$$

where $e_{ij}$ measures similarity between inputs.

Here $P_{W_Q}(x_i)$ and $P_{W_K}(x_j)$ project $x_i$ and $x_j$ to query and key spaces, respectively.

Embodiments herein may use 6 layers of self-attention and use h to denote the top layer out output sequence (i.e., the source context).

On the decoder side, during training time, the ground truth output sequence $y^*=(y_1^*, \ldots, y_m^*)$ may go through the same self-attention to generate hidden self-attended state sequence $c=(c_1, \ldots, c_m)$. It is noted that because decoding is incremental, $e_{ij}$ may be set 0 if j>i in Eq. 13 to restrict self-attention to previously generated words.

In embodiments, in each layer, after gathering the hidden representations for each target word through self-attention, target-to-source attention may be performed:

$$c_i' = \sum_{j=1}^{n} \beta_{ij} P_{W_V}(h_j)$$

similar to self-attention, $\beta_{ij}$ measures the similarity between $h_j$ and $c_i$ as in Eq. 13.

4. Training Simultaneous Transformer

In embodiments, simultaneous translation feeds the source words incrementally to the encoder, but a naive implementation of such incremental encoder/decoder may be inefficient. A faster implementation is described below.

For the encoder, during training time, an entire sentence may be fed at once to the encoder. But unlike the self-attention layer in conventional Transformer (Eq. 13), in embodiments, each source word may be constrained to attend only to its predecessors (similar to decoder-side self-attention), effectively simulating an incremental encoder:

$$\alpha_{ij}^{(t)} = \begin{cases} \frac{\exp e_{ij}^{(t)}}{\sum_{l=1}^{g(t)} \exp e_{il}^{(t)}} & \text{if } i, j \leq g(t) \\ 0 & \text{otherwise} \end{cases}$$

-continued $$e_{ij}^{(t)} = \begin{cases} \frac{P_{W_Q}(x_i) P_{W_K}(x_j)^T}{\sqrt{d_x}} & \text{if } i, j \leq g(t) \\ 0 & \text{otherwise} \end{cases}$$

Then, in embodiments, a newly defined hidden state sequence z(t) $(z_1^{(t)}, \ldots, z_n^{(t)})$ at decoding step t may be expressed as:

$$z_i^{(t)} = \sum_{j=1}^{n} \alpha_{ij}^{(t)} P_{W_V}(x_j) \qquad \text{(Eq. 14)}$$

When a new source word is received, all previous source words should adjust their representations.

G. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

This section first presents the accuracy and latency of the introduced wait-k model. Then, it is demonstrated that the catchup model reduces the latency even further with little or no sacrifice of accuracy. Finally, some examples from the dev set and from recent news are analyzed.

The performance of the various models is demonstrated on four simultaneous translation directions: Chinese↔English and German↔English. For the training data, the parallel corpora available from Workshop Statistical Machine Translation (WMT15) is used for German↔English translation (4.5 million sentence pairs) and the National Institute of Standards and Technology (NIST) corpus for Chinese↔English translation (2 million sentence pairs). First, byte-pair encoding (BPE) is applied on all texts in order to reduce vocabulary size for both source and target sides. Then the sentences pairs whose length are longer than 50 and 256 words for respective English-to-German and Chinese-to-English are excluded. For German↔English evaluation, newstest-2013 (dev) is used as development set and newstest-2015 (test) is used as test set with 3,000 and 2,169 sentence pairs, respectively. The implementation is adapted from PyTorch-based Open-Source Neural Machine Translation (OpenNMT). For Chinese↔English evaluation, NIST 2006 and NIST 2008. They contain 616 and 691 Chinese sentences, each with four English references. In the catchup experiments, the decoding catchup frequency of c=0.25, which is derived from the dev set tgt/src length ratio of 1.25, is used. For de↔en translation task, no catch is used since the tgt/src ratio is almost 1.

When translating from Chinese to English, 4-reference BLEU scores are reported and, in the reverse direction, the second among the four English references is used as the source text, and 1-reference BLEU scores are reported.

The implementation is adapted from PyTorch-based Open-Source Neural Machine Translation (OpenNMT). The Transformer's parameters are the same as those of the base model's parameter settings in the original paper (Vaswani et al., 2017 Attention is all you need. In *Advances in Neural Information Processing Systems* 30).

Figure 10:
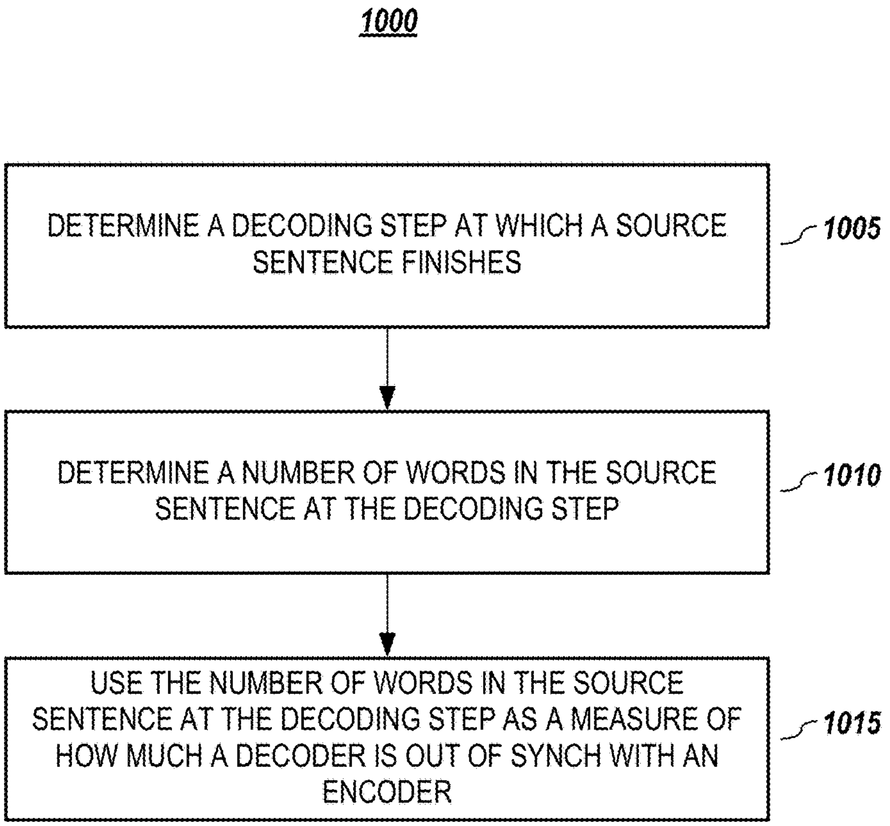
FIG. 10 is a flowchart of an illustrative process for measuring how much a user is out of synch with a speaker, according to various embodiments of the present disclosure.

FIG. 10 is a flowchart of an illustrative process for measuring how much a user is out of synch with a speaker, according to various embodiments of the present disclosure. Process 1000 begins when a decoding step (1005) is determined at which a source sentence finishes. Then a number of words in the source sentence at the decoding step is determined (1010). Finally, the number of words in the source sentence at the decoding step is used as a measure (1015) of how much a decoder is out of synch with an encoder. In embodiments, this measure is representative how of much a user is out of synch with a speaker.

1. Performance of Wait-k Model

Figure 15A:
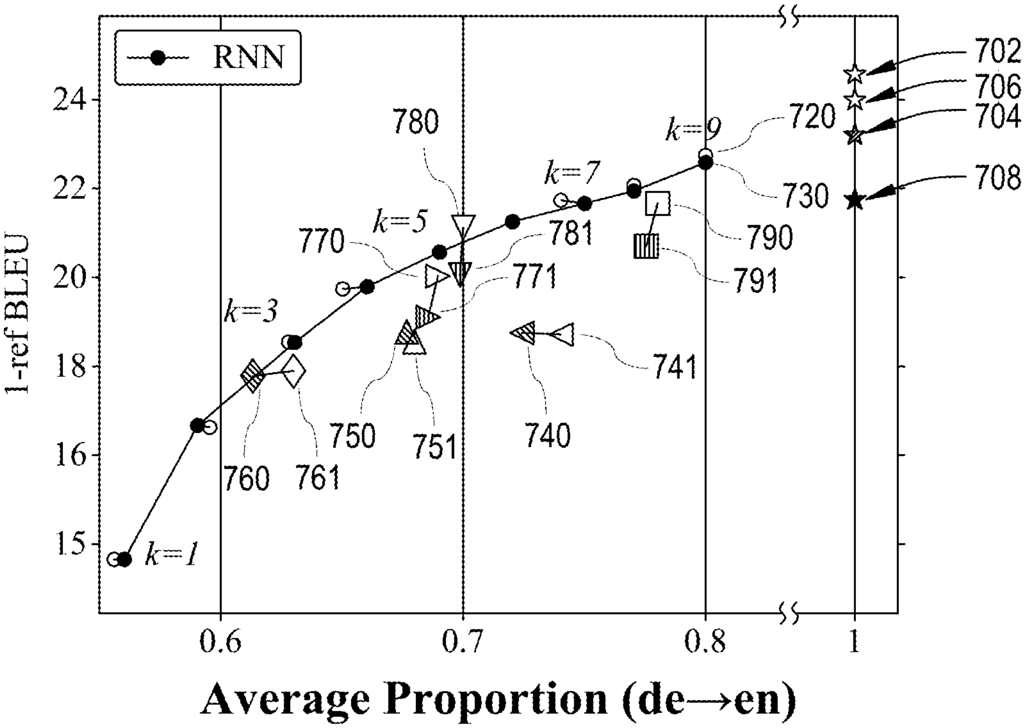
FIG. 15A and FIG. 15B illustrate translation quality against latency metrics on English-to-German simultaneous translation, according to various embodiments of the present disclosure.
Figure 15B:
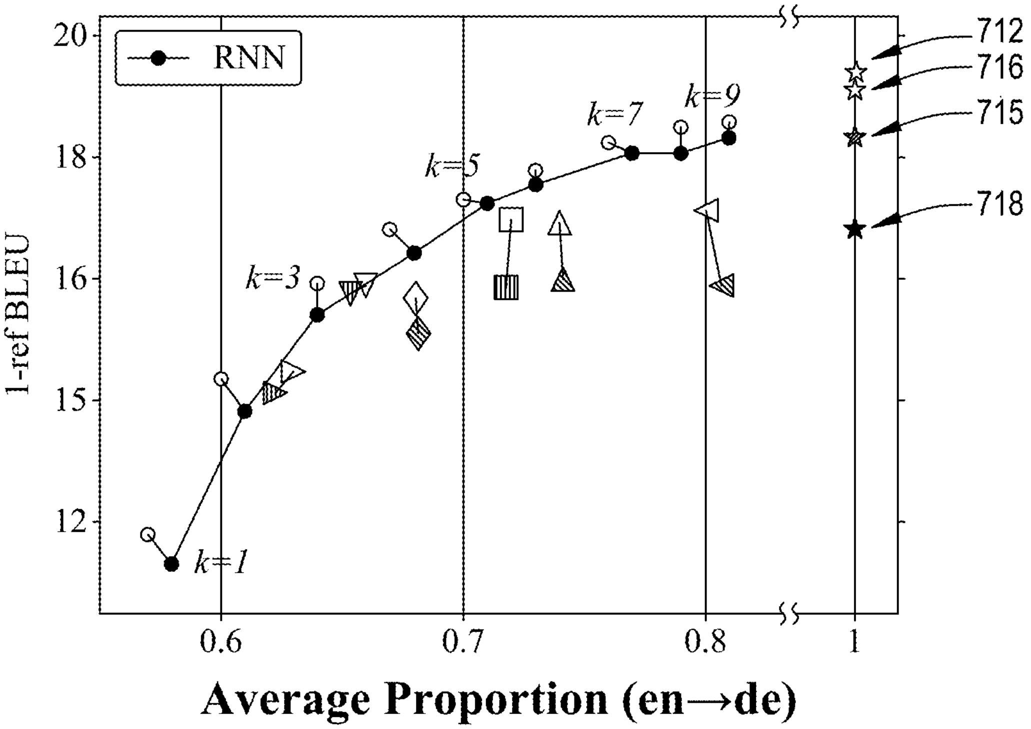

In FIG. 15A and FIG. 15B, the BLEU score and AP are compared with the model from Gu et al., 2017 on dev set for English-to-German and German-to-English tasks. In FIG. 15A and FIG. 15B, 702 and 704 represent full-sentence baselines with RNNs (greedy decoding and beam-search with beam-size 11, respectively). Line plots 720 and 730 represent the wait-k policy's greedy and tail beam search results with RNNs. Point-pairs are the results from Gu et al. (2017) using greedy decoding and beam-search (beam-size 5) with models trained with various delay targets: 706, 708: full-sentence, 740, 741: CW=8, 750, 751: CW=5, 760, 761: CW=2, 770, 771: AP=0.3, 780, 781: AP=0.5, 790, 791: AP=0.7. It is noted that Gu et al.'s models trained with AP=0.5 achieve a test-time AP around 0.7 (de→en) and 0.66 (en→de).

The results indicate that the RNN-based model according to various embodiments outperforms the model from Gu et al. (2017) in both translation directions and the simultaneous Transformer according to various embodiments achieves much better performance.

Figure 16A:
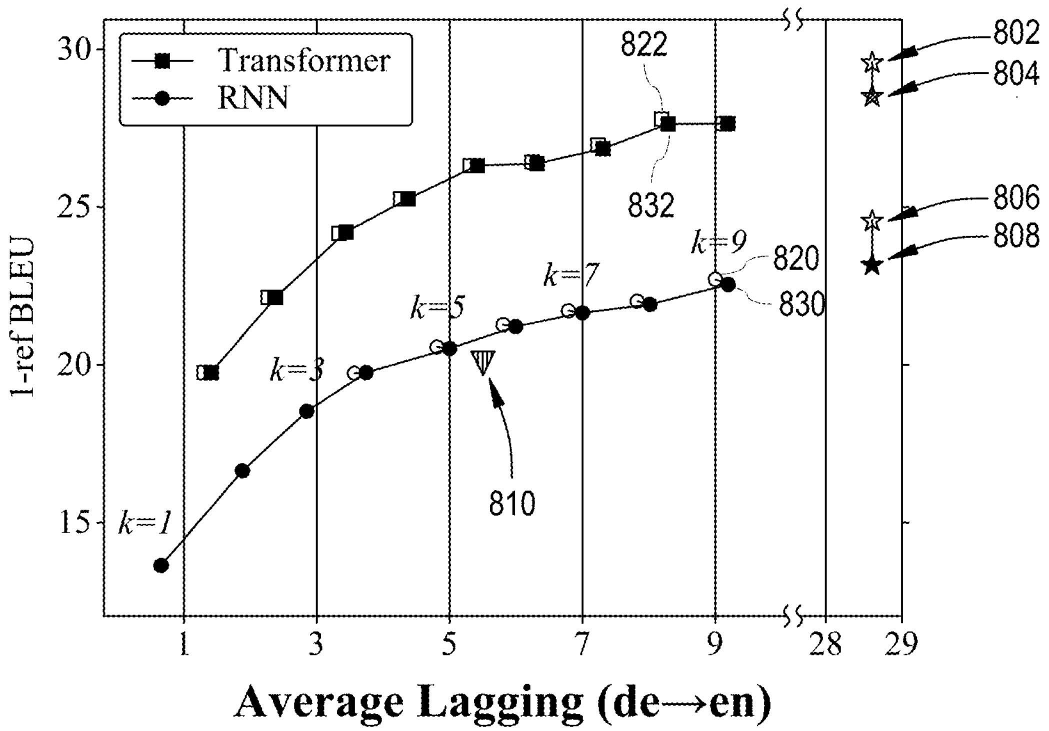
FIG. 16A and FIG. 16B illustrate translation quality against latency on zh→en.
Figure 16B:
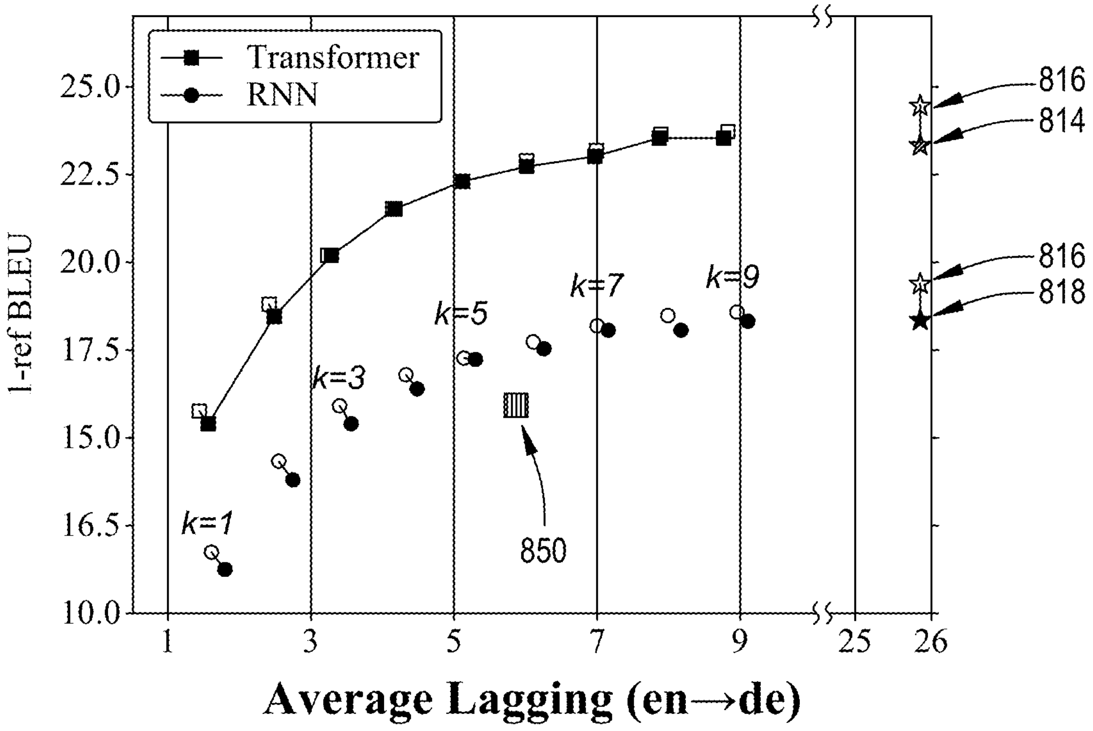

FIG. 16A and FIG. 16B illustrate BLEU scores for wait-k models on German-to-English (FIG. 16A) and English-to-German (FIG. 16B) with latency measured by AL. The BLEU score is compared together with AL between RNN and Transformer-based models. Also included are AL values of one model of Gu et al. (2017) in each direction based on the decoded action sequences provided by the authors in Gu et al. (2017).

Figure 11A:
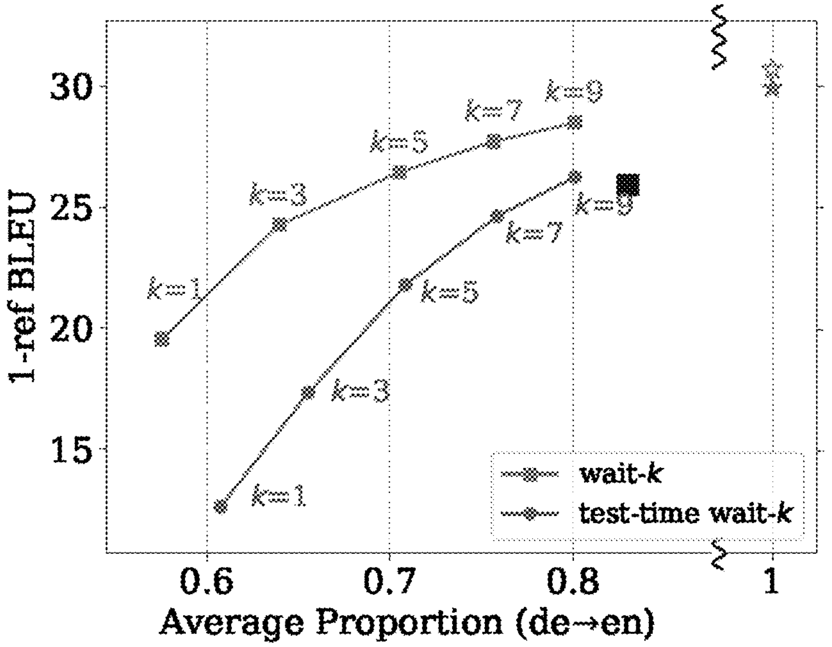
FIG. 11A and FIG. 11B illustrate Bilingual Evaluation Understudy (BLEU) score and AP comparisons with the model by Gu et al. (2017) (Jiatao Gu, Graham Neubig, Kyunghyun Cho, and Victor 0. K. Li. 2017. "Learning to translate in real-time with neural machine translation," In Proceedings of the 15th Conference of the European Chapter of the Association for Computational Linguistics, EACL 2017, Valencia, Spain, Apr. 3-7, 2017, Volume 1: Long Papers, pages 1053-1062. aclanthology.info/papers/E17-1099/e17-1099) for different wait-k models on German-to-English (FIG. 11A) and English-to-German (FIG. 11B) translation.
Figure 11B:
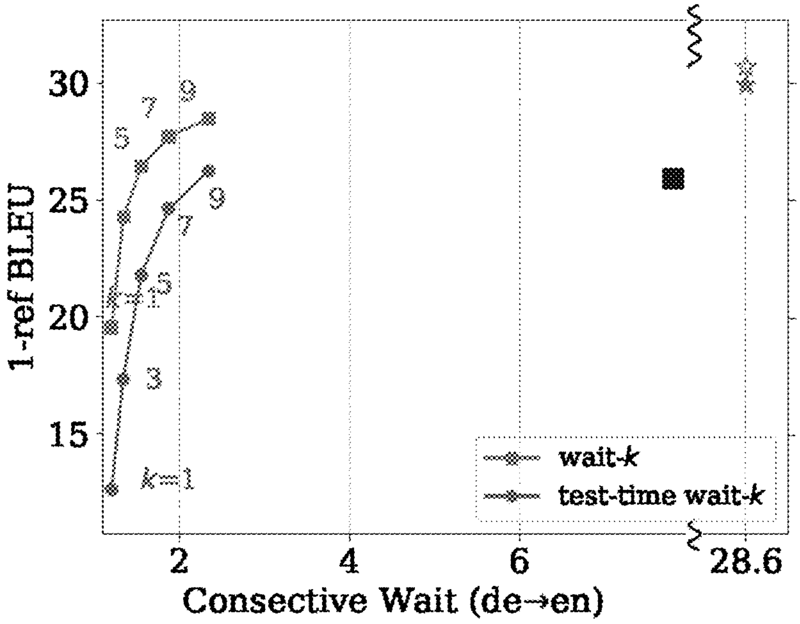
Figure 12A:
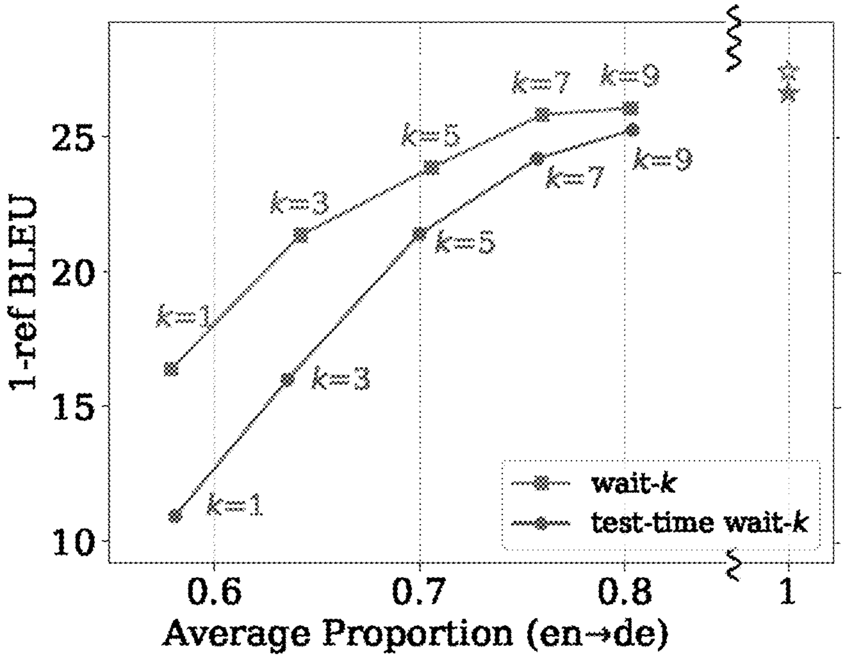
FIG. 12A and FIG. 12B illustrate BLEU scores for wait-k models on German-to-English (FIG. 12A) and English-to-German (FIG. 12B) with latency measured by Averaged Lagging (AL), according to various embodiments of the present disclosure.
Figure 12B:
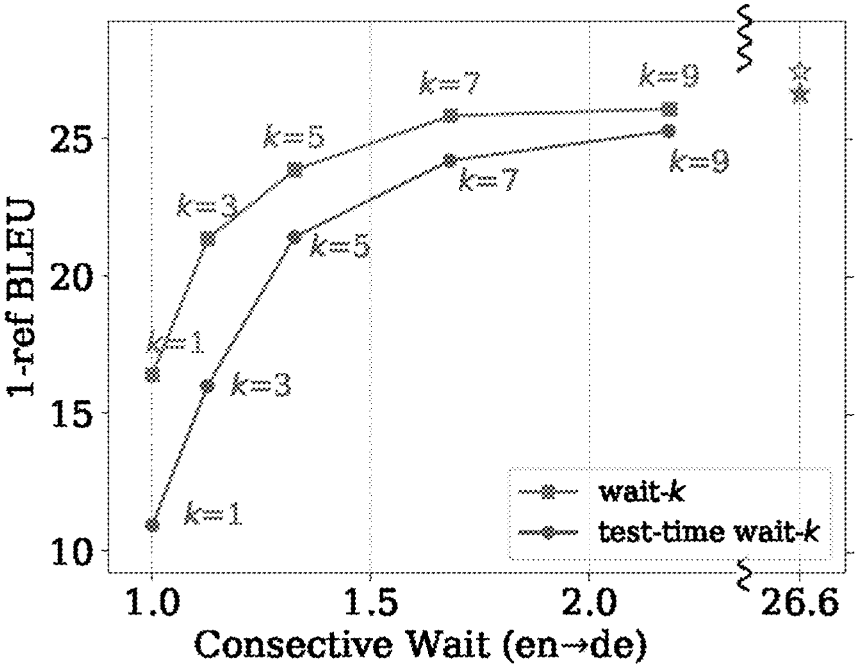
Figure 13A:
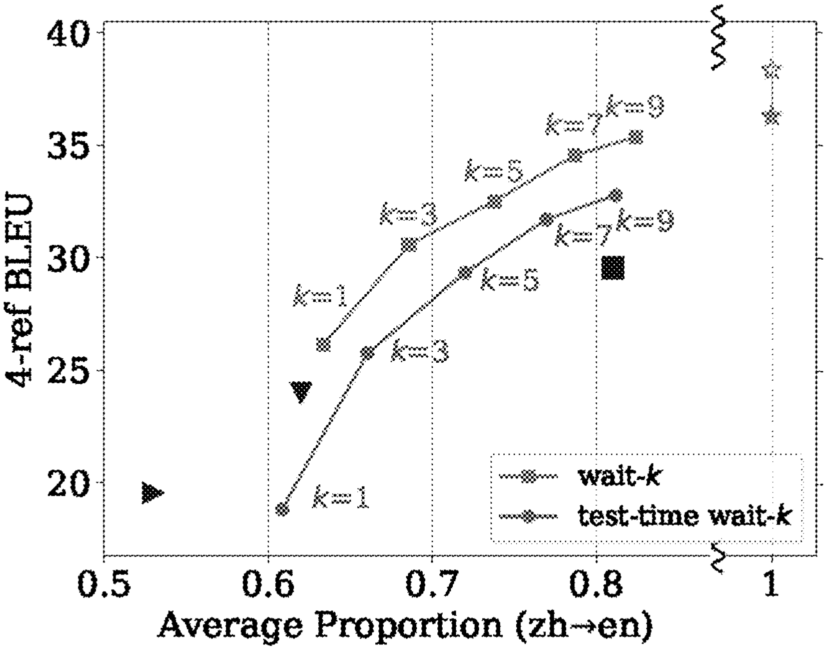
FIG. 13A and FIG. 13B illustrate BLEU scores and AL comparisons with different wait-k models on Chinese-to-English (FIG. 13A) and English-to-Chinese (FIG. 13B) translations on a development (dev) set, according to various embodiments of the present disclosure.
Figure 13B:
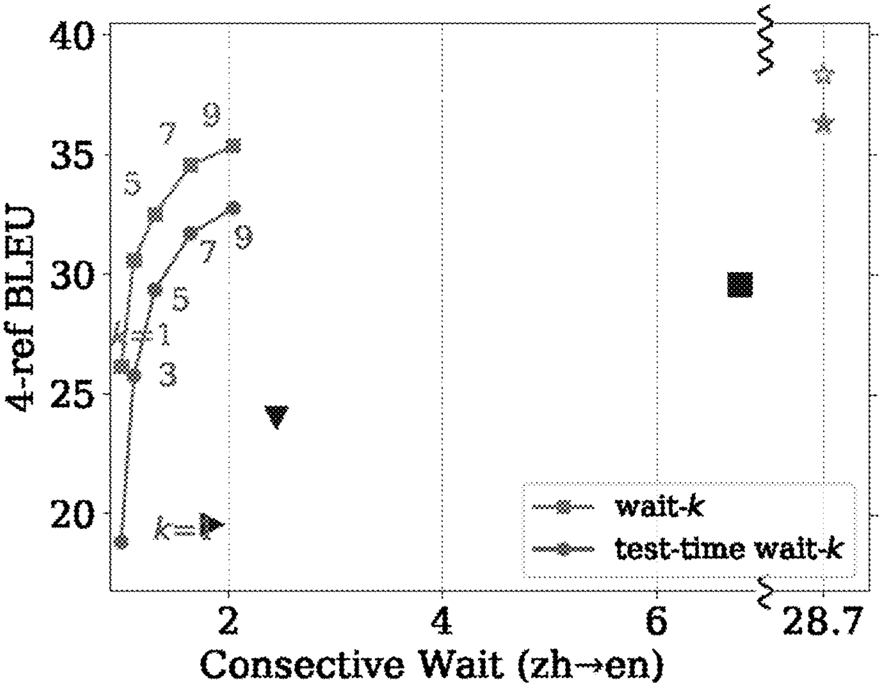

802, 804 and 806, 808 are greedy decoding and beam-search baselines for Transformer and RNN models, respectively. Similarly, 830 and 832 are decoded using greedy strategy, while 820 and 822 are decoded with tail beam search. 810: AP=0.5 and 850: AP=0.7 are the same points as in FIG. 11A and FIG. 11B.

Figure 17A:
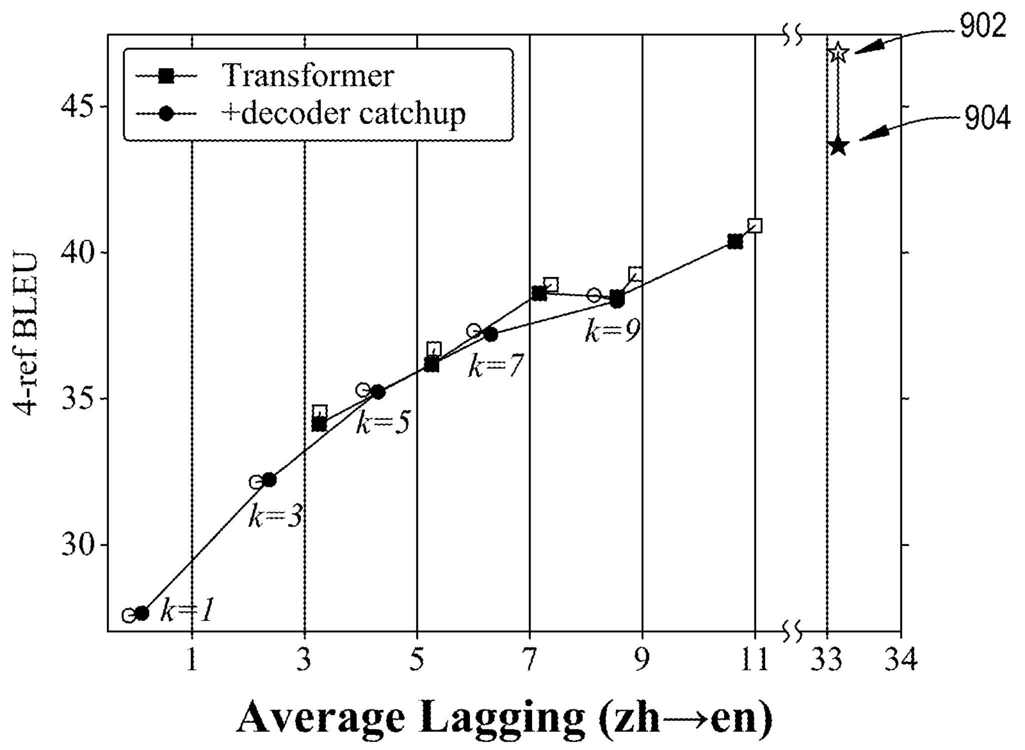
FIG. 17A and FIG. 17B illustrate translation quality against latency on en→zh.
Figure 17B:
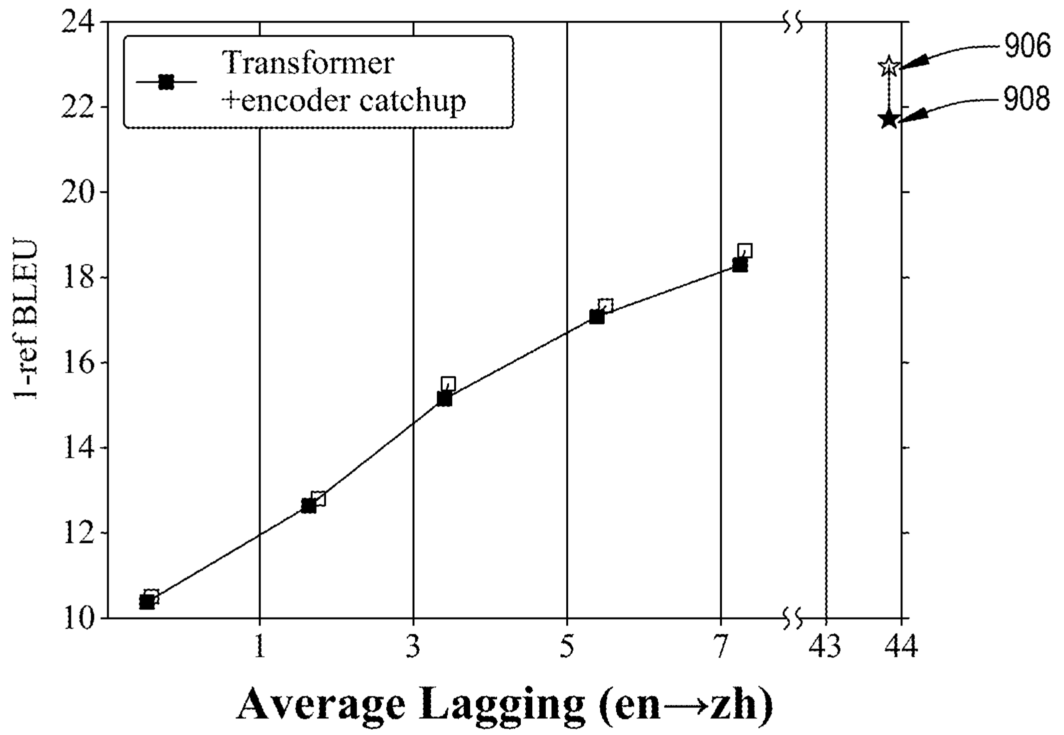

The performance between Chinese and English is shown in FIG. 17A and FIG. 16B and FIG. 17B which illustrate BLEU scores and AL comparisons with different wait-k models on Chinese-to-English (FIG. 17A) and English-to-Chinese (FIG. 17B) translations on dev set. Note that 4-ref BLEU is used for Chinese-to-English but 1-ref BLEU is used for English-to-Chinese since the multiple references are only available on the English side. 902, 904 and 906, 908 are greedy decoding and beam-search baselines. The difference between wait-k and wait-k with decoder catchup are compared in FIG. 17A for Chinese-to-English translation. For the direction English-to-Chinese, in FIG. 17B wait-k with encoder catchup is shown since source side is much longer than target side.

CW measures the average source segment length and is also compared in Table 1.

TABLE 1

Compare with (Gu et al., 2017) on dev set with CW and BLEU score. At similar or higher BLEU levels, disclosed models enjoy much lower CWs.

| | k = 3 | k = 4 | k = 5 | k = 6 | Gu et al. |
|---|---|---|---|---|---|
| de→en | | | | | |
| CW | 1.35 | 1.43 | 1.54 | 1.65 | 3.85 |
| BLEU | 18.54 | 19.78 | 20.53 | 21.23 | 20.70 |

TABLE 1-continued

Compare with (Gu et al., 2017) on dev set with CW and BLEU score. At similar or higher BLEU levels, disclosed models enjoy much lower CWs.

| | k = 3 | k = 4 | k = 5 | k = 6 | Gu et al. |
|---|---|---|---|---|---|
| en→de | | | | | |
| CW | 1.13 | 1.22 | 1.33 | 1.48 | 3.36 |
| BLEU | 15.40 | 16.41 | 17.24 | 17.56 | 15.93 |

As analyzed in Sec. E, wait-k has AL close to 1. With similar or better BLEU scores, CWs are much lower than those by Gu et al. (2017), which indicates better user experience.

More comprehensive comparisons on the test sets are shown in Tables 2A and 2B (FIGS. 25A and 25B) that show performance data of wait-k with Transformer, its catchup version, and wait-k with RNN models with various k on the de↔en and zh↔en test sets, according to various embodiments of the present disclosure. For each k, the numbers on the left side are from greedy decoding, and right, italic font numbers are from tail beam search. ∞ represents the baseline with results from greedy and beam search.

2. Quality and Latency of Wait-k Model

| | Test | | | | | |
|---|---|---|---|---|---|---|
| Train | k = 1 | k = 2 | k = 3 | k = 5 | k = 7 | k = ∞ |
| k' = 1 | *34.3* | 31.5 | 31.2 | 31.1 | 30.4 | 19.2 |
| k' = 3 | 34.9 | 36.2 | 37.2 | *37.7* | 37.3 | 19.5 |
| k' = 5 | 30.4 | 36.8 | 30.8 | 38.9 | *39.0* | 24.3 |
| k' = 7 | 30.6 | 36.6 | 38.6 | *39.4* | 39.1 | 23.1 |
| k' = 9 | 27.4 | 34.7 | 38.5 | 39.9 | *40.6* | 27.4 |
| k' = ∞ | 26.2 | 32.7 | 36.9 | 39.3 | 41.0 | *43.7* |

Table 3 shows the results of a model according to various embodiments of the present disclosure that is trained with wait-k' and decoded with wait-k (where ∞ means full-sentence). The disclosed wait-k is the diagonal, and the last row is the "test-time wait-k" decoding. It is noted that good results of wait-k decoding may be achieved using a model that has been trained with a slightly larger than k'.

FIG. 14-FIG. 17 plot translation quality (in BLEU) against latency (in AP and CW) for full-sentence baselines, wait-k, test-time wait-k (using full-sentence models), and a reimplementation of Gu et al. (2017) on the same Transformer baseline, according to various embodiments of the present disclosure. ★★: full-sentence (greedy and beam-search), Gu et al. (2017): ■: AP=0.7. Note that their model trained with AP=0.7 achieves a test-time AP of 0.8 and CW of 7.8.

Figure 14A:
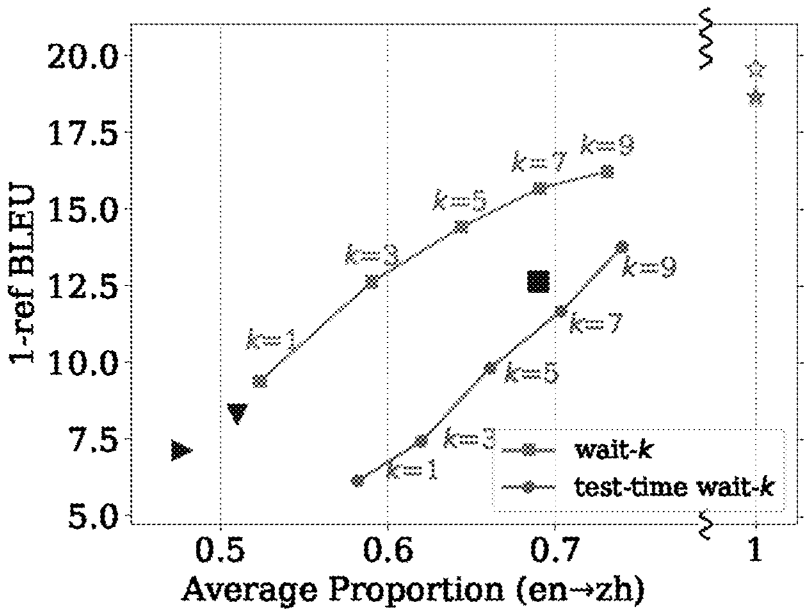
FIG. 14A and FIG. 14B illustrate translation quality against latency metrics on German-to-English simultaneous translation, showing wait-k models, test-time wait-k results, full-sentence baselines, and a reimplementation of Gu et al. (2017), all based on the same Transformer, according to various embodiments of the present disclosure.
Figure 14B:
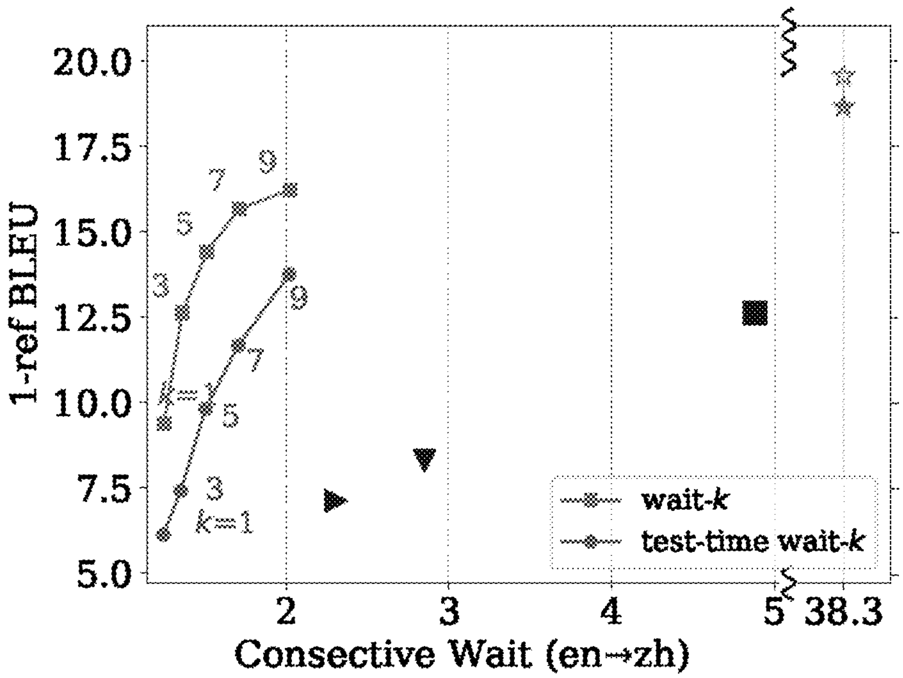

FIG. 14A and FIG. 14B illustrate translation quality against latency metrics (AP and CW) on German-to-English simultaneous translation, showing wait-k models (for k=1, 3, 5, 7, 9), test-time wait-k results, full-sentence baselines, and a reimplementation of Gu et al. (2017), all based on the same Transformer, according to various embodiments of the present disclosure.

FIG. 15A and FIG. 15B illustrate translation quality against latency metrics on English-to-German simultaneous translation, according to various embodiments of the present disclosure.

FIG. 16A and FIG. 16B illustrate translation quality against latency on zh→en. Gu et al. (2017): ▶: AP=0.3, ▼: AP=0.5, ■: AP=0.7, according to various embodiments of the present disclosure.

FIG. 17A and FIG. 17B illustrate translation quality against latency on en→zh. Gu et al. (2017): ▶: AP=0.3, ▼: AP=0.5, ■: AP=0.7, according to various embodiments of the present disclosure.

As FIG. 14 through FIG. 17 show, as k increases, (a) wait-k improves in BLEU score and worsens in latency, and (b) the gap between test-time wait-k and wait-k decreases. Eventually, both wait-k and test-time wait-k approach the full-sentence baseline as k→∞, consistent with intuition.

Next the results are compared with the reimplementation of Gu et al. (2017)'s two-staged full-sentence model+reinforcement learning on Transformer. On BLEU-vs.-AP plots, the two-staged full-sentence models perform similar to test-time wait-k for de↔en and zh↔en and slightly better than test-time wait-k for en→zh, which is reasonable as both use a full-sentence model at the core. However, on BLEU-vs-CW plots, the two-staged full-sentence models have much worse CWs, which is consistent with results published by Gu et al. This is because the R/W model prefers consecutive segments of READs and WRITEs (e.g., the two-staged full-sentence model often produces, e.g., R R R R R W W W W R R R W W W W R . . . ) while various embodiments using wait-k translate concurrently with the input (the initial segment has length k, and others have length 1, thus, resulting in a relatively lower CW). It is noted that training for the two-staged full-sentence models were found to be relatively unstable due to the use of RL, whereas the presented embodiments were very robust.

3. Examples and Discussion

FIGS. 18-23 showcase some translation examples. The figures illustrate real running examples that have been generated from the introduced model(s) and baseline framework to demonstrate the effectiveness of the disclosed systems. Shown are the encoding step number and source language (and pinyin when translated from Chinese) with its gloss in the upper side. Different generation results with different wait-k models and baselines are shown in the lower part of the tables in FIGS. 18-23. It is noted that the baseline method, which starts generating words after the entire source sentence is encoded, is the last row, while the disclosed model(s) only wait-k encoding steps.

Figure 18:
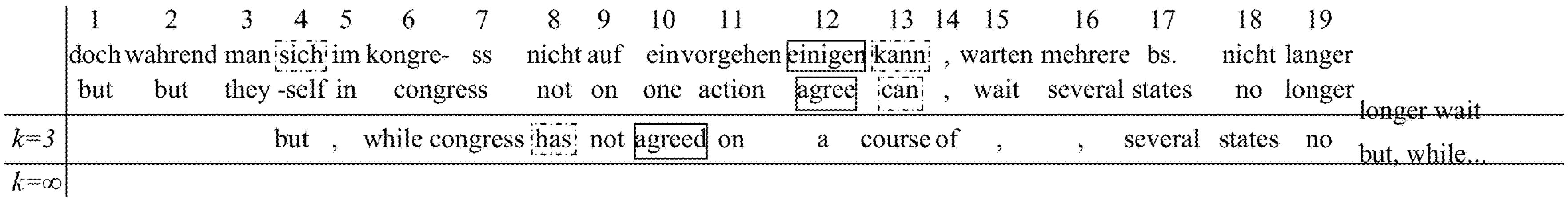

FIG. 18 shows a German-to-English example in the dev set with anticipation. The main verb in the embedded clause, "einigen" (agree), is correctly predicted 3 words ahead of time (with "sich" providing a strong hint), while the auxiliary verb "kann" (can) is predicted as "has." The baseline translation is "but, while congressional action cannot be agreed, several states are no longer waiting." bs.: Bundesstaaten.

Figure 19:
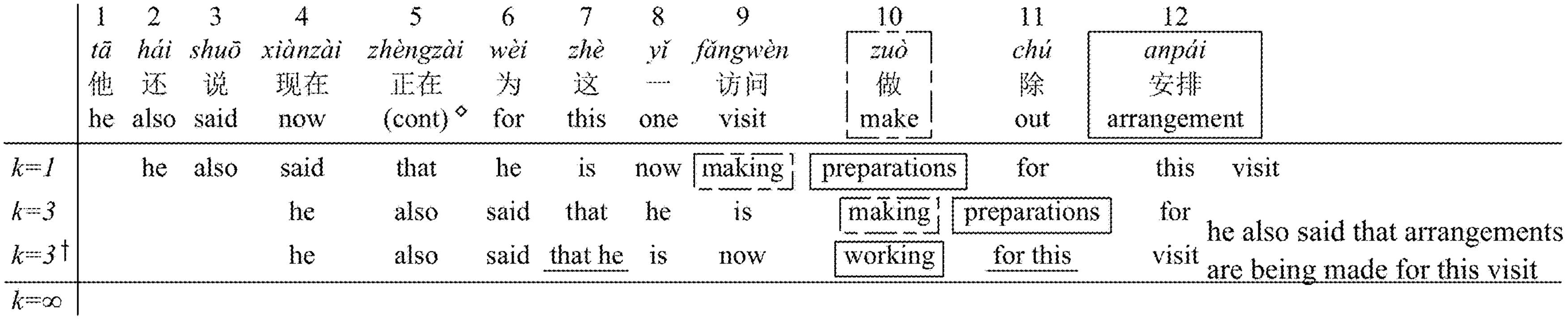

FIG. 19 shows a Chinese-to-English example in the dev set with anticipation. Both wait-1 and wait-3 policies yield perfect translations, with "making preparations" predicted well ahead of time. ◇: continuous tense marker. †: +catchup, which produces slightly worse output, and finishes ahead of the source sentence.

Figure 20:
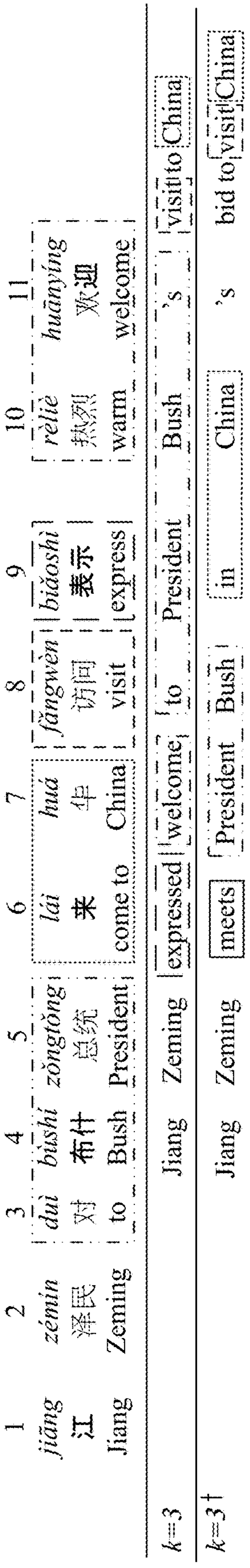
Figure 23:
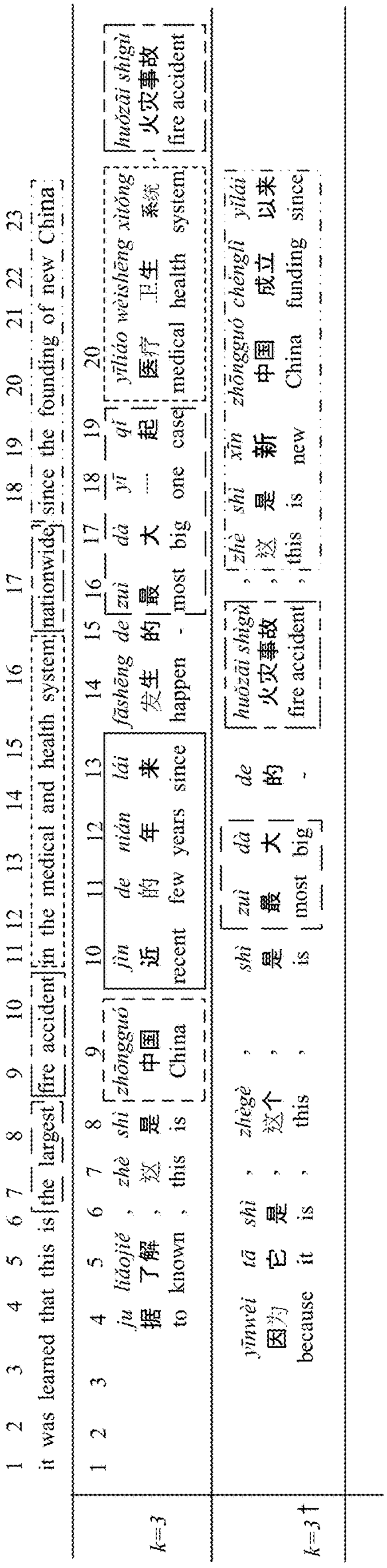

FIG. 20 shows a Chinese-to-English example from online news. The wait-3 model correctly anticipates both "expressed" and "welcome" (though missing "warm"), and moves the PP ("to . . . visit to china") to the very end which is fluent in the English word order.

FIG. 21 shows another Chinese-to-English example in the dev set. Again, both wait-1 and wait-3 correctly predicted "invitation" because the Chinese construction "*yìng* NP *de yāoqǐng*" means "at the invitation of NP." Furthermore, both predict "visit" (6 words ahead of *yāoqǐng* time in wait-1), and wait-1 even predicts "Pakistan and India." The baseline full-sentence translation is identical to that of our wait-1 policy. Abbreviations: invit.: invitation; pak.: Pakistani/Pakistan; ind.: Indian/India; govts: governments; mar.: March.; &: and; †: +catchup, which produces the identical translation but predicts more ahead of time.

Except in FIG. 22 example (b), wait-k models generally anticipate correctly, often producing translations as good as the full-sentence baseline. In FIG. 22, for example (a) both the verb "gǎndào" ("feel") and the predicative "dānyōu" ("concerned") are correctly anticipated, probably hinted by the word "missing." †: +catchup. Example (b) shows that when the last word dānyōu is changed to bùmǎn ("dissatisfied"), the wait-3 translation result remains unchanged (correct for example (a) but incorrect for example (b)), whereas wait-5 translates conservatively and produces the correct translation without anticipation.

4. Human Evaluation on Anticipation

| | k = 3 | k = 5 | k = 7 | k = 3 | k = 5 | k = 7 |
|---|---|---|---|---|---|---|
| | zh→en | | | en→zh | | |
| sentence % | 33 | 21 | 9 | 52 | 27 | 17 |
| word % | 2.51 | 1.49 | 0.56 | 5.76 | 3.35 | 1.37 |
| accuracy % | 55.4 | 56.3 | 66.7 | 18.6 | 20.9 | 22.2 |
| | de→en | | | en→de | | |
| sentence % | 44 | 27 | 8 | 28 | 2 | 0 |
| word % | 4.50 | 1.50 | 0.56 | 1.35 | 0.10 | 0.00 |
| accuracy % | 26.0 | 56.0 | 60.0 | 10.7 | 50.0 | n/a |

Table 4 shows human evaluations on anticipation rates for sentences and words and accuracy in all four directions, using 100 examples in each language pair from the dev sets. As shown, with increasing k, anticipation rates decrease (at both sentence and word levels), and anticipation accuracy improves. Moreover, anticipation rates different greatly among the four directions, with en→zh>de→en>zh→en>en→de Interestingly, this order is exactly the same as the order of the BLEU-score gaps between full-sentence models and a wait-9 model according to various embodiments of the present disclosure:

en→zh: 2.0>de→en: 1.1>zh→en: 1.3†>en→de: 0.3

(†: difference in 4-ref BLEUs, which in experiments reduces by about half in 1-ref BLEUs). This order roughly characterizes the relative difficulty of simultaneous translation in these directions. As the example sentence in FIG. 23 demonstrates, en→zh translation is particularly difficult due to the mandatory long-distance reorderings of English sentence-final temporal clauses, such as "in recent years," to much earlier positions in Chinese. It is also well-known that de→en is more challenging in simultaneous translation than en→de since SOV→SVO involves prediction of the verb, while SVO→SOV generally does not need prediction in wait-k models for relatively small k, e.g., k=3, because the V is often shorter than the O. For example, human evaluation found only 1.3%, 0.1%, and 0% word anticipations in en→de for k=3, 5 and 7, and 4.5%, 1.5%, and 0.6% for de→en.

H. Related Work

The work of Gu et al. (2017) may be distinguished from various embodiments in present disclosure in a number of key aspects. For example, the full-sentence model (a) cannot anticipate future words; (b) cannot achieve any specified latency metric, unlike the wait-k model according to various embodiments that achieves a k-word latency; (c) is not a genuine simultaneous model but rather a combination of two models that uses a full-sentence base model to translate, thus, creating a mismatch between training and testing, and (d) training is also two-staged, using reinforcement learning (RL) to update the R/W model, unlike various embodiments in present disclosure that are trained from scratch.

In a parallel work, some authors propose an "eager translation" model that outputs target-side words before the whole input sentence is fed into the model. However, that model has two major drawbacks. First, it aims to translate full sentences using beam search and is, therefore, not a simultaneous model. Second, it does not anticipate future words. Third, it uses word alignments to learn the reordering and achieve it in decoding by emitting a: token. In contrast, various embodiments of the present disclosure integrate reordering into a single wait-k prediction model that is agnostic with respect to, yet, capable of reordering.

One approach adds the prediction action to the architecture of Gu et al. (2017), but the used encoder and decoder are still trained on full sentences. Instead of predicting the source verb, which might come after several words, this approach predicts the immediately following source words, which is not particularly useful for SOV-to-SVO translation. In contrast, various embodiments presented herein predict directly on the target side, thus, integrating anticipation into a single translation model.

I. Some Conclusions

Presented are prefix-to-prefix training and decoding framework embodiments for simultaneous translation with integrated anticipation, and embodiments of a wait-k policy that can achieve arbitrary word-level latency while maintaining high translation quality. These prefix-to-prefix architecture embodiments have the potential to be used in other sequence tasks outside of MT that involve simultaneity or incrementality.

J. Computing System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output devices, such as a speaker, a microphone, a camera, a keyboard, a mouse, touchscreen and/or a video display. The information handling system may also include one or more buses operable to transmit communications between the various hardware components.

Figure 24:
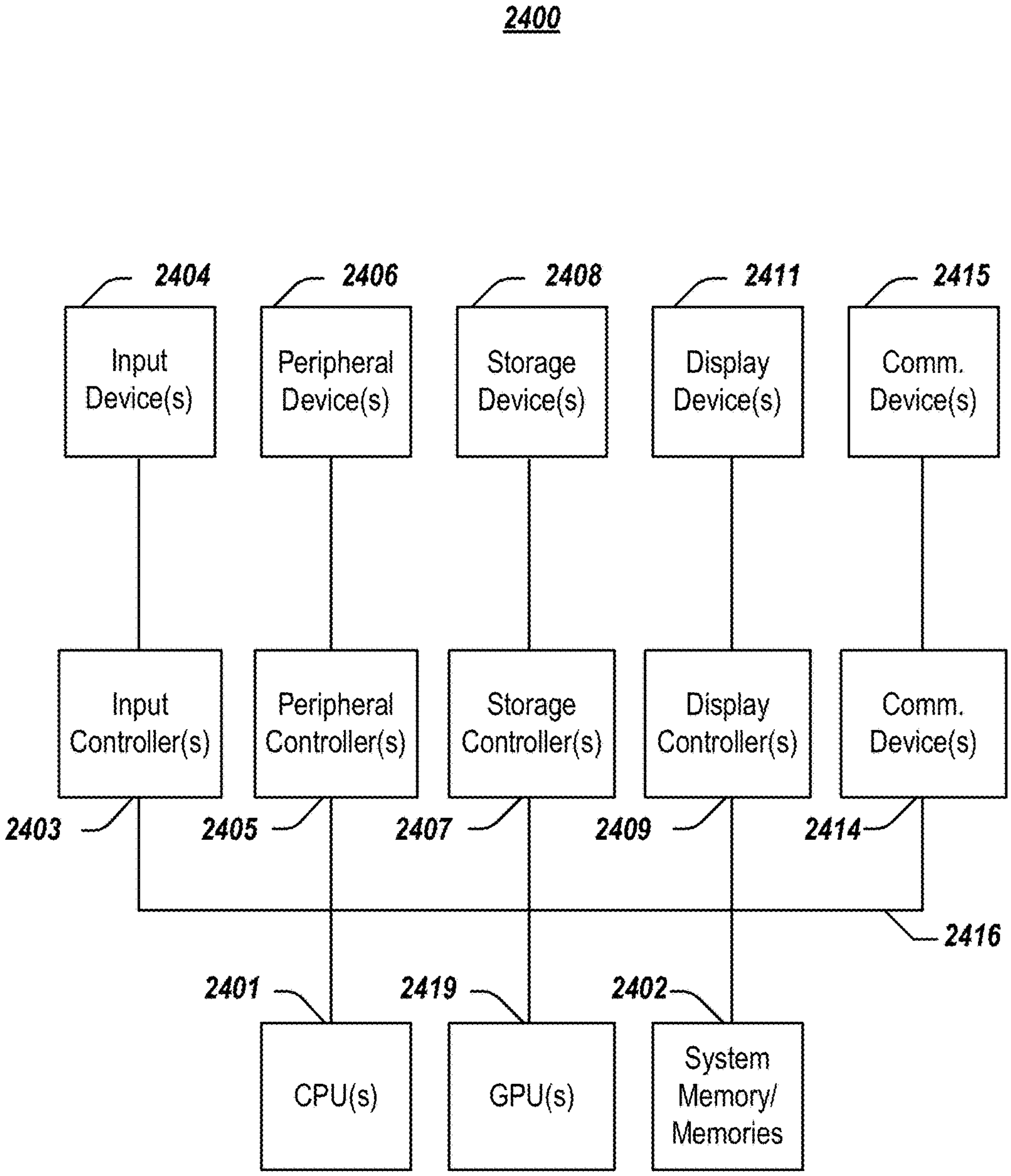
FIG. 24 depicts a simplified block diagram of a computing device/information handling system, according to various embodiments of the present disclosure.

FIG. 24 depicts a simplified block diagram of a computing device/information handling system (or computing system) according to embodiments of the present disclosure. It will be understood that the functionalities shown for system 2400 may operate to support various embodiments of a computing system—although it shall be understood that a computing system may be differently configured and include different components, including having fewer or more components as depicted in FIG. 24.

As illustrated in FIG. 24, the computing system 2400 includes one or more central processing units (CPU) 2401 that provides computing resources and controls the computer. CPU 2401 may be implemented with a microprocessor or the like, and may also include one or more graphics processing units 2419 and/or a floating-point coprocessor for mathematical computations. System 2400 may also include a system memory 2402, which may be in the form of random-access memory (RAM), read-only memory (ROM), or both.

A number of controllers and peripheral devices may also be provided, as shown in FIG. 24. An input controller 2403 represents an interface to various input device(s) 2404, such as a keyboard, mouse, touchscreen, and/or stylus. The computing system 2400 may also include a storage controller 2407 for interfacing with one or more storage devices 2408 each of which includes a storage medium such as magnetic tape or disk, or an optical medium that might be used to record programs of instructions for operating systems, utilities, and applications, which may include embodiments of programs that implement various aspects of the present invention. Storage device(s) 2408 may also be used to store processed data or data to be processed in accordance with the invention. The system 2400 may also include a display controller 2409 for providing an interface to a display device 2411, which may be a cathode ray tube, a thin film transistor display, organic light-emitting diode, electroluminescent panel, plasma panel, or other type of display. The computing system 2400 may also include one or more peripheral controllers or interfaces 2405 for one or more peripherals. Example of peripheral may include one or more printers, scanners, input devices, output devices, sensors, and the like. A communications controller 2414 may interface with one or more communication devices 2415, which enables the system 2400 to connect to remote devices through any of a variety of networks including the Internet, a cloud resource (e.g., an Ethernet cloud, an Fiber Channel over Ethernet/Data Center Bridging cloud, etc.), a local area network, a wide area network, a storage area network, or through any suitable electromagnetic carrier signals including infrared signals.

In the illustrated system, all major system components may connect to a bus 2416, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for low-latency translation, the method comprising:
- receiving in a chronological sequence, at a neural network, source language tokens of an input, the neural network having been trained to mimic translating in a chronological sequence by being trained to make a sequence of predictions of one or more target language tokens in order to translate a training input, which comprises a full sentence or an incomplete sentence, in which each prediction uses (1) a different sequence of one or more source language tokens from the training input and in which at least one or more of the different sequences used in predicting comprise fewer source language tokens than in the training input, and (2) one or more previously generated target language tokens, if any;
- using one or more received source language tokens, which form a prefix, and the neural network to predict and output one or more target language tokens;
- using the neural network, repeating until a stop condition is reached steps comprising:
- responsive to receiving a next source language token of the input that is not a source end-of-input signal:
  - updating the prefix;
  - using the updated prefix and one or more previously predicted target language tokens to predict a next target language token; and
  - outputting the next target language token; and
- responsive to receiving the source end-of-input signal, using all of the source language tokens in the input or a subset thereof to generate any remaining target language tokens to complete translation of the input.

2. The method according to claim 1, wherein using the one or more received source language tokens, which form the prefix, comprises using a monotonic non-decreasing function that defines, for each prediction step, which of the source language tokens form the prefix to be used for prediction.

3. The method according to claim 1, wherein the step of updating the prefix comprises using a monotonic non-decreasing function that defines the source language tokens to be used to form the prefix for a prediction step.

4. The method according to claim 1, wherein training the neural network comprises maintaining, for at least part of a prediction process for a training input, a ratio between a number of source language tokens received and a number of target language predictions made.

5. The method according to claim 1, wherein the input is text received from a user interface or from an input audio stream that has been converted to text using automated speech recognition.

6. The method according to claim 2, wherein the monotonic non-decreasing function that defines, for each prediction step, which of the source language tokens form the prefix to be used for prediction comprises waiting until a preset number of k source language tokens have initially been received before performing the step of using one or more received source language tokens, which form the prefix, and the neural network to predict one or more target language tokens.

7. The method according to claim 1, wherein the neural network comprises an encoder and a decoder, the method further comprising:
- determining a decoding step of the decoder at which the encoder has received the source end-of-input signal;
- determining a number of tokens of the input that have been translated up to the decoding step; and
- using the number of tokens in the input that have been translated up to the decoding step as a measure of how much the decoder is out of synch with the input.

8. A computer-implemented method for training a neural network for translating an input in a source language into an output in a target language, the method comprising:

given an input in the source language, which has a corresponding ground-truth translation in the target language:

receiving, at the neural network, source language tokens associated with the input, each source language token having an index value related to its order in the input;

repeating, until a stop condition is reached, steps comprising:

using a pre-defined function that is a function of the index value to identify a set of one or more source language tokens to be used for a prediction step, in which at least one set of one or more source language tokens used in a prediction step comprises fewer than all of the source language tokens associated with the input;

using the identified set of one or more source language tokens and one or more previously predicted target language tokens, if any, to predict one or more target language tokens;

adding the predicted one or more target language tokens to the output in the target language; and incrementing the index value; and responsive to a stop condition being reached, using a comparison of the output in the target language to its ground-truth translation in updating the neural network.

9. The computer-implemented method according to claim 8, wherein a first set of one or more source language tokens defined by the pre-defined function comprises a predetermined number of initial source language tokens, which are used in predicting the first one or more target language tokens for the output.

10. The computer-implemented method according to claim 9, wherein the pre-defined function comprises generating, for each successive source language token of a set of consecutive source language tokens, a subsequent target language token.

11. The computer-implemented method according to claim 8, further comprising:

responsive to reaching a cutoff point, applying a beam search or a full-input model to the source language tokens of the input to generate any remaining target language tokens.

12. The computer-implemented according to claim 11, wherein the cutoff point is a decoding step at an index when the input ends.

13. The computer-implemented method according to claim 8, wherein the neural network comprises an encoder that receives a sequence of word embeddings for each word in the input and produces a corresponding sequence of hidden states, and the encoder is implemented using at least one of a recurrent neural network (RNN) model and a Transformer.

14. The computer-implemented method according to claim 8, wherein the neural network does not generate a target end-of-input signal until after a source-side end-of-input signal has been received by the neural network.

15. The computer-implemented method according to claim 13, wherein each source language token is constrained to attend only to its predecessors thereby simulating an incremental encoder.

16. A non-transitory computer-readable medium or media comprising one or more sequences of instructions which, when executed by at least one processor, causes steps to be performed comprising:

receiving, at a neural network, a source language token of an input, in which source language tokens of the input are received in a chronological sequence and each source language token is associated with a number that represents its number in the chronological sequence of the source language tokens that have been received;

using a pre-defined function, which is a function of the number associated with the received source language token, to identify a set of one or more source language tokens to be used for a prediction step, in which at least one set of one or more source language tokens used in a prediction step comprises fewer than all of the source language tokens associated with the input;

responsive to all of the source language tokens in the identified set of one or more source language tokens having been received by the neural network and processed by an encoder of the neural network to produce a corresponding set of hidden states, using the corresponding hidden states of the identified set of one or more source language tokens and one or more previously generated target language tokens, if any, to predict one or more target language tokens;

responsive to not all of the source language tokens in the identified set of one or more source language tokens having been received by the neural network, waiting until all of the source language tokens in the identified set of one or more source language tokens having been received by the neural network and processed by an encoder of the neural network to produce a corresponding set of hidden states and using the corresponding hidden states of the identified set of one or more source language tokens and one or more previously generated target language tokens, if any, to predict one or more target language tokens;

adding the predicted one or more target language tokens to an output in the target language;

responsive to a stop condition not being reached, returning to the step of receiving, at a neural network, a source language token of an input to receive a next source language token; and responsive to a stop condition being reached, concluding translation for the input.

17. The non-transitory computer-readable medium or media of claim 16, wherein the at least one processor comprises a decoder predicts a first set of target language tokens in response to receiving a first set of hidden states corresponding to a first set of source language tokens of the input.

18. The non-transitory computer-readable medium or media of claim 16, wherein, in a training phase, the neural network was trained to mimic translating in a chronological sequence by being trained to make a sequence of predictions of one or more target language tokens in order to translate a training input, which comprises a full sentence or an incomplete sentence, in which each prediction uses (1) a sequence of one or more source language tokens from the training input and in which at least one or more of the sequences used in predicting comprise fewer source language tokens than in the training input, and (2) one or more previously generated target language tokens, if any.

19. The non-transitory computer-readable medium or media of claim 18, wherein the encoder generates the sequence of hidden states by using either a recurrent neural network (RNN) or a transformer.

20. The non-transitory computer-readable medium or media of claim 16, wherein the source language tokens are received from text input or from an input audio stream that has been converted to source language tokens using automated speech recognition.

* * * * *